United States Patent
Ivanov et al.

(10) Patent No.: US 12,476,736 B2
(45) Date of Patent: Nov. 18, 2025

(54) CONCATENATED CODE ENCODING METHOD, CONCATENATED CODE DECODING METHOD, AND COMMUNICATION APPARATUS

(71) Applicant: HUAWEI TECHNOLOGIES CO., LTD., Guangdong (CN)

(72) Inventors: Fedor Ivanov, Saint Petersburg (RU); Kangjian Qin, Hangzhou (CN); Yue Zhou, Shenzhen (CN); Rong Li, Boulogne Billancourt (FR); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/755,334

(22) Filed: Jun. 26, 2024

(65) Prior Publication Data
US 2024/0348368 A1    Oct. 17, 2024

Related U.S. Application Data

(63) Continuation of application No. PCT/CN2022/139456, filed on Dec. 16, 2022.

(30) Foreign Application Priority Data

Dec. 29, 2021   (RU) ................................ 2021139606

(51) Int. Cl.
*H03M 13/00* (2006.01)
*H04L 1/00* (2006.01)

(52) U.S. Cl.
CPC .......... *H04L 1/0064* (2013.01); *H04L 1/0057* (2013.01); *H04L 1/0061* (2013.01)

(58) Field of Classification Search
CPC ... H04L 1/0057; H04L 1/0065; H04L 1/0064; H04L 1/1861; H03M 13/2906; H03M 13/251; H03M 13/1108
See application file for complete search history.

(56) References Cited

U.S. PATENT DOCUMENTS 9,164,835 B2 *  10/2015  Lee ..................... G06F 11/1072
10,193,578 B2 *   1/2019  Gross .................... H03M 13/09
(Continued)

FOREIGN PATENT DOCUMENTS

EP    4395182 A1    7/2024
WO   2019158031 A1  8/2019

OTHER PUBLICATIONS

Eslami et al., "On Finite-Length Performance of Polar Codes: Stopping Sets, Error Floor, and Concatenated Design," IEEE Transactions on Communications, Mar. 2013, 61(3):919-929.
(Continued)

*Primary Examiner* — Esaw T Abraham
(74) *Attorney, Agent, or Firm* — Fish & Richardson P.C.

(57) ABSTRACT

This application provides example concatenated code encoding and decoding methods. In one example method, polar code encoding is performed on a to-be-encoded message bit sequence based on a frozen bit set and a message bit set that are of a first polar code, to obtain a first encoded code word whose length is N_o. The first encoded code word is interleaved to obtain a second encoded code word, and optimized low-density parity-check (LDPC) code encoding is performed on the second encoded code word to obtain a concatenated code word. Interleaving includes both outer interleaving and inner interleaving. The concatenated code word is then outputted.

13 Claims, 22 Drawing Sheets

(56) References Cited

U.S. PATENT DOCUMENTS

| | | | | |
|---|---|---|---|---|
| 10,498,490 | B2* | 12/2019 | Hui | H04L 1/0071 |
| 11,463,114 | B2* | 10/2022 | Koike-Akino | H03M 13/116 |
| 12,184,413 | B2* | 12/2024 | Jang | H03M 13/27 |
| 2017/0104496 | A1* | 4/2017 | Zhang | H04L 1/0041 |

OTHER PUBLICATIONS

Meng et al., "A Novel Interleaving Scheme for Polar Codes," Paper, Presented at the 2016 IEEE 84th Vehicular Technology Conference (VTC-Fall), Montreal, QC, Canada, Sep. 18-21, 2016; IEEE, Mar. 20, 2017, 5 pages.

Zhang et al., "Performance of Polar-LDPC Concatenated Coding on AWNG Channel," Paper, Presented at the 2020 IEEE International Conference on Artificial Intelligence and Information Systems (ICAIIS), Dalian, China, Mar. 20-22, 2020; IEEE, Sep. 11, 2020, pp. 685-688.

Partial Supplementary European Search Report in European Appln. No. 229143151, mailed on May 8, 2025, 15 pages.

Wang et al., "Optimization Design of Polar-LDPC Concatenated Scheme Based on Deep Learning," Computers and Electrical Engineering, Jun. 2020, 84:1-10.

Zhang et al., "Irregular LDPC-polar concatenation scheme with designed scaling factors," Electronics Letters, vol. 55, No. 1, Jan. 10, 2019, pp. 57-59.

Mahdavifar et al., "On the construction and decoding of concatenated polar codes," Proceedings of 2013 IEEE International Symposium on Information Theory, Oct. 7, 2013, pp. 952-956.

Duo, "Polar Coding Schemes for Cooperative Transmission Systems," Thesis for the degree of Doctor of Philosophy, University of Sydney, School of Electrical and Information Engineering, Mar. 2016, 192 pages.

Mao et al., "Serially concatenated scheme of polar codes and the improved belief propagation decoding algorithm," The Institution of Engineering and Technology, IET Communications, Aug. 2020, 14(14):10 pages.

Extended European Search Report in European Appln. No. 22914315.1, mailed on Aug. 19, 2025, 17 pages.

* cited by examiner

500

┌─────────────────────────────────────────────────────────────────┐
│ Obtain a channel receive vector whose length is Ni, where Ni is a length of an │
│ inner code of a concatenated code, the inner code of the concatenated code is an │──⟶ 510
│ optimized LDPC code, an outer code of the concatenated code is a polar code, and │
│ Ni is a positive integer │
└─────────────────────────────────────────────────────────────────┘
                                    ↓
┌─────────────────────────────────────────────────────────────────┐
│ Decode the channel receive vector by using a SISO decoding algorithm of the │──⟶ 520
│ optimized LDPC code, to obtain a first soft information sequence whose length is │
│ Ni │
└─────────────────────────────────────────────────────────────────┘
                                    ↓
┌─────────────────────────────────────────────────────────────────┐
│ De-interleave the first soft information sequence to obtain a de-interleaved first │
│ soft information sequence, and extract soft information at first N_o locations in │
│ the de-interleaved first soft information sequence to obtain a second soft │──⟶ 530
│ information sequence, where N_o is a length of the outer code of the concatenated │
│ code, and N_o is a positive integer │
└─────────────────────────────────────────────────────────────────┘
                                    ↓
┌─────────────────────────────────────────────────────────────────┐
│ Perform soft information iterative decoding by using a soft SCL decoding │
│ algorithm of the polar code and the SISO decoding algorithm of the optimized │
│ LDPC code based on the second soft information sequence, the channel receive │──⟶ 540
│ vector, and a preset maximum iteration quantity of times of the concatenated code, │
│ to obtain a third soft information sequence │
└─────────────────────────────────────────────────────────────────┘
                                    ↓
┌─────────────────────────────────────────────────────────────────┐
│ Perform a hard decision on the third soft information sequence to obtain a decoded │──⟶ 550
│ candidate sequence │
└─────────────────────────────────────────────────────────────────┘
                                    ↓
┌─────────────────────────────────────────────────────────────────┐
│ Output the decoded candidate sequence │──⟶ 560
└─────────────────────────────────────────────────────────────────┘

FIG. 8

Quantity of non-zero elements = 92

Quantity of non-zero elements = 2560

Quantity of non-zero elements = 13066

Quantity of non-zero elements = 2560

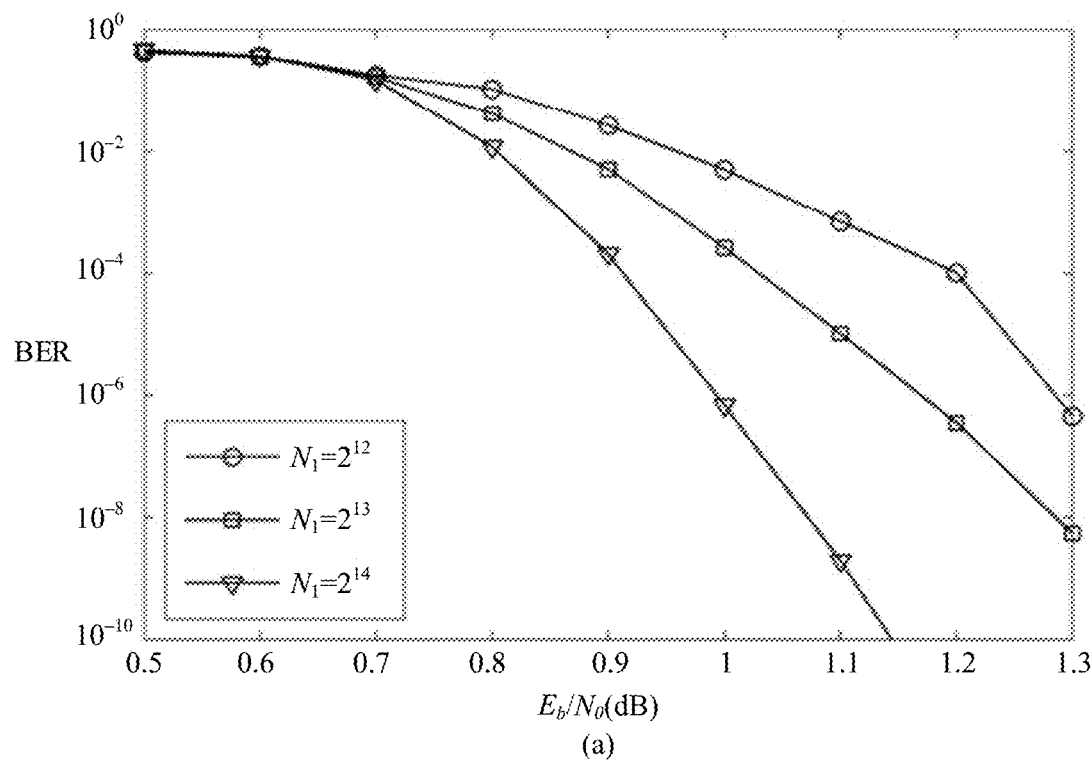
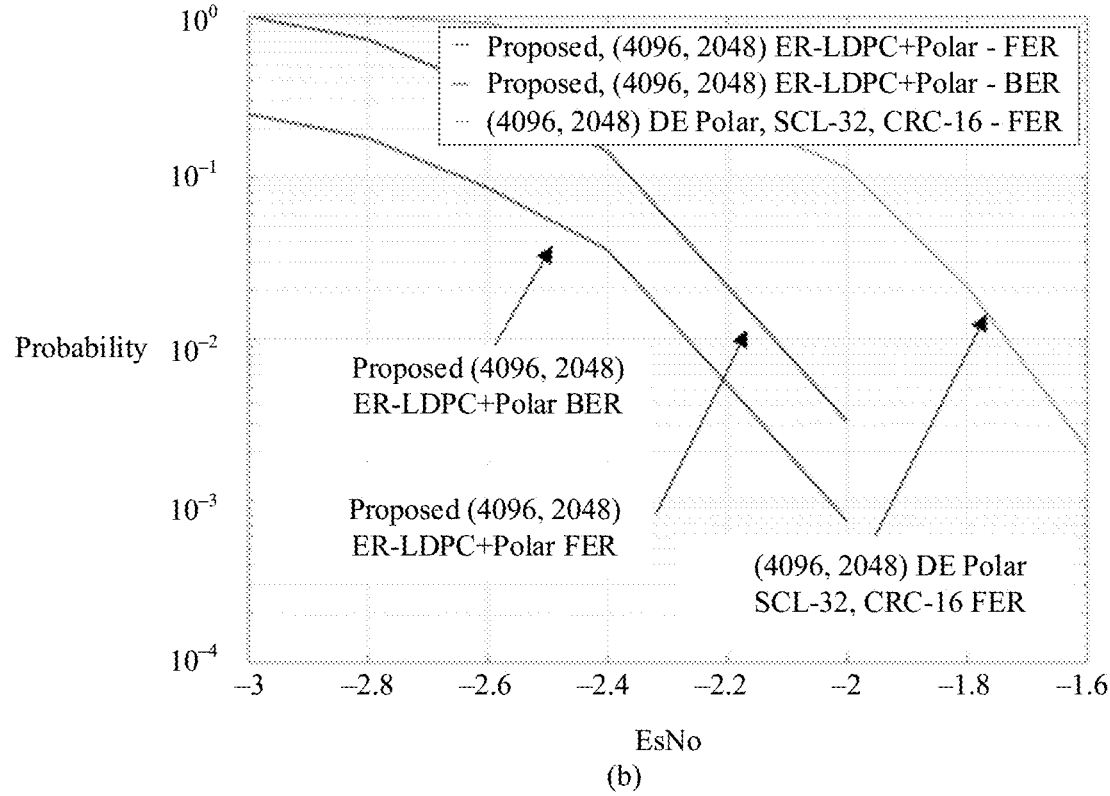
FIG. 21

CONCATENATED CODE ENCODING METHOD, CONCATENATED CODE DECODING METHOD, AND COMMUNICATION APPARATUS

CROSS-REFERENCE TO RELATED APPLICATIONS

This application is a continuation of International Application No. PCT/CN2022/139456, filed on Dec. 16, 2022, which claims priority to Russian Federation (RU) Patent Application No. RU2021139606, filed on Dec. 29, 2021. The disclosures of the aforementioned applications are hereby incorporated by reference in their entireties.

TECHNICAL FIELD

This application relates to the field of channel encoding, and more specifically, to a concatenated code encoding method, a concatenated code decoding method, and a communication apparatus.

BACKGROUND

In the field of channel encoding and decoding, concatenated codes can achieve a higher encoding gain and a lower decoding delay. A concatenated encoding policy usually includes an inner code and an outer code. It may be considered that a function of the inner code is to perform "noise reduction" on a physical channel to obtain a better super channel, so that a channel condition provided for the outer code is better than that of the original physical channel.

Currently, there are many schemes for concatenating different code words, such as a code concatenation scheme of a polar code and a low-density parity-check (low-density parity-check, LDPC) code, a code concatenation scheme of a Reed-Solomon (Reed-Solomon, RS) code and a polar code, and a concatenation scheme of a polar code and a low-density generator matrix (low-density generation matrix, LDGM). However, in general, decoding performance of these concatenated codes needs to be improved.

SUMMARY

This application provides a concatenated code encoding method and a concatenated code decoding method, to improve decoding performance of the concatenated code and further improve flexibility in adapting to different code lengths and code rates.

According to a first aspect, a concatenated code encoding method is provided. The method includes:
obtaining a to-be-encoded message bit sequence;
performing polar code encoding on the to-be-encoded message bit sequence based on a frozen bit set and a message bit set that are of a first polar code, to obtain a first encoded code word whose length is N_o;
interleaving the first encoded code word to obtain a second encoded code word;
performing optimized low-density parity-check LDPC code encoding on the second encoded code word to obtain a concatenated code word, where
the interleaving includes outer interleaving and inner interleaving, where
the outer interleaving includes: mapping R frozen bits in the frozen bit set of the first polar code to R rows of a generator matrix of the optimized LDPC code, where row weights of the R rows are lower than or equal to row weights of rows of the generator matrix other than the R rows (that is, the R rows have the lowest row weights in the generator matrix, or a row weight of a row with the highest row weight in the R rows is lower than or equal to a row weight of a row with the lowest row weight in the remaining rows of the generator matrix); and
mapping (N_o-R) message bits in the message bit set of the first polar code to remaining (N_o-R) rows of the generator matrix of the optimized LDPC code other than the R rows; and
the inner interleaving includes: interleaving on the R frozen bits in the frozen bit set of the first polar code and interleaving on the (N_o-R) message bits in the message bit set of the first polar code; and
outputting the concatenated code word.

In the technical solution provided in this application, the polar code as an outer code and the ER-LDPC code as an inner code provided in this application are concatenated, and a special interleaver is designed between the polar outer code and the ER-LDPC inner code based on respective features of the polar code and the ER-LDPC code, so that error transmission caused by a burst error can be reduced, an error correlation between the polar code word and the ER-LDPC code word can be reduced, and overall decoding performance of the concatenated code can be improved.

In addition, the interleaver can further simplify polar code decoding.

The ER-LDPC provided in this application is different from the conventional LDPC. The ER-LDPC code has apparent external characteristics. Specifically, a check matrix of the ER-LDPC code has all-zero columns, and a check bit cannot check variable nodes at these locations. However, these all-zero columns correspond to frozen locations of the polar code. Therefore, the ER-LDPC code provided in this application does not have an error correction capability, but has an outstanding noise reduction capability.

With reference to the first aspect, in some implementations of the first aspect, the method further includes:
randomly generating a basis matrix of an LDPC code;
optimizing the basis matrix to obtain an optimized basis matrix, where the optimized basis matrix is capable of reaching a minimum BER within a given BER range, and a signal-to-noise ratio SNR required at the minimum BER is minimum;
generating a lifting matrix; and
obtaining a basis matrix of the optimized LDPC code based on the optimized basis matrix and the lifting matrix, where the generator matrix of the optimized LDPC code is determined based on the basis matrix of the optimized LDPC code.

This application provides a method for extending the basis matrix of the ER-LDPC code. The protograph of the ER-LDPC code extends flexibly, and it may be suitable for the basis matrix of the ER-LDPC code to be extended by any size, that is, a lifting size may be any value. In addition, the matrix of the ER-LDPC code is a system matrix, which can simplify encoding and decoding processes.

With reference to the first aspect, in some implementations of the first aspect, a size of the basis matrix is m rows and n columns, and the generating a lifting matrix includes:
constructing a row vector whose size is m and a column vector whose size is n, where any two elements in the row vector are different, any two elements in the column vector are different, both m and n are less than or equal to p, p is a factor by which the basis matrix of the optimized LDPC code needs to be extended, and m, n, and p are all integers; and obtaining the lifting matrix based on the row vector and the column vector.

With reference to the first aspect, in some implementations of the first aspect, the obtaining the lifting matrix based on the row vector and the column vector includes:

constructing the lifting matrix M $(i,j)=r_i \cdot c_j$ mod p, where in the row vector $C_{rows}=(r_1, r_2, \ldots, r_m)$, $r_i$ is an $i^{th}$ element in the row vector $C_{rows}$, $r_i \neq r_j$, in the column vector $C_{cols}=(c_1, c_2, \ldots, c_n)$, $c_j$ is a $j^{th}$ element in the column vector $C_{cols}$, $c_i \neq c_j$, and mod is a modulo operation.

With reference to the first aspect, in some implementations of the first aspect, the method further includes:

constructing an initial polar code at a target signal-to-noise ratio SNR; and performing iterative optimization on the initial polar code a specified quantity of times based on the optimized LDPC code and the initial polar code, to obtain the first polar code, where an intermediate polar code is obtained each time the iterative optimization is performed, and if frame error rate FER performance of the concatenated code with an intermediate polar code obtained through $j^{th}$ iterative optimization as an outer code and with the optimized LDPC code as an inner code is better than FER performance of the concatenated code with an intermediate polar code obtained through $(j-1)^{th}$ iterative optimization as an outer code and with the optimized LDPC code as an inner code, the outer code of the concatenated code is updated to the intermediate polar code obtained through the $j^{th}$ iterative optimization; and the initial polar code is an initially determined outer code of the concatenated code, and the first polar code is a finally determined outer code of the concatenated code through the iterative optimization the specified quantity of times, where j>1, j is less than or equal to the specified quantity of times, and j is an integer.

According to a second aspect, a concatenated code decoding method is provided. The method includes:

obtaining a channel receive vector whose length is $N_i$, where $N_i$ is a length of an inner code of a concatenated code, the inner code of the concatenated code is an optimized LDPC code, an outer code of the concatenated code is a polar code, and $N_i$ is a positive integer;

decoding the channel receive vector by using a soft input soft output SISO decoding algorithm of the optimized LDPC code, to obtain a first soft information sequence whose length is $N_i$;

de-interleaving the first soft information sequence to obtain a de-interleaved first soft information sequence, and extracting soft information at first N_o locations in the de-interleaved first soft information sequence to obtain a second soft information sequence, where N_o is a length of the outer code of the concatenated code, and N_o is a positive integer;

performing soft information iterative decoding by using a soft SCL decoding algorithm of the polar code and the SISO decoding algorithm of the optimized LDPC code based on the second soft information sequence, the channel receive vector, and a preset maximum iteration quantity of times of the concatenated code, to obtain a third soft information sequence;

performing a hard decision on the third soft information sequence to obtain a decoded candidate sequence; and outputting the decoded candidate sequence.

For the concatenated code of the polar code and the optimized LDPC code (also referred to as an ER-LDPC code) provided in this application, decoding is implemented by the soft information iterative decoding using a combination of the soft SCL decoding algorithm and the SISO decoding algorithm, so that decoding complexity can be reduced.

With reference to the second aspect, in some implementations of the second aspect, the performing soft information iterative decoding by using a soft SCL decoding algorithm of the polar code and the SISO decoding algorithm of the optimized LDPC code based on the second soft information sequence, the channel receive vector, and a preset maximum iteration quantity of times max_Iter of the concatenated code, to obtain a third soft information sequence includes:

performing soft information iterative decoding (j−1) times to obtain a $(j-1)^{th}$ soft information sequence outputted by the soft SCL decoding algorithm;

subtracting a soft information sequence inputted by the soft SCL decoding algorithm in a $(j-1)^{th}$ soft information iterative decoding process from the $(j-1)^{th}$ soft information sequence, to obtain a $j^{th}$ piece of extrinsic information of the SISO decoding algorithm;

using the $j^{th}$ piece of extrinsic information and the channel receive vector as an input into the SISO decoding algorithm in a $j^{th}$ soft information iterative decoding process, to obtain an output of the SISO decoding algorithm in the $j^{th}$ soft information iteration process; and using the output of the SISO decoding algorithm in the $j^{th}$ soft information iteration process as prior information of the soft SCL decoding algorithm in the $j^{th}$ soft information iterative decoding process, to obtain a $j^{th}$ soft information sequence of the soft SCL decoding algorithm, where the $j^{th}$ soft information sequence of the soft SCL decoding algorithm is a soft information sequence outputted by the soft SCL decoding algorithm in the $j^{th}$ soft information iteration process;

the $j^{th}$ piece of extrinsic information of the SISO decoding algorithm is extrinsic information inputted to the SISO decoding algorithm in the $j^{th}$ soft information iteration process;

the second soft information sequence is a soft information sequence inputted to the soft SCL decoding algorithm in a first soft information iteration process, and the third soft information sequence is a soft information sequence outputted by the soft SCL decoding algorithm in a last soft information iteration process; and 1<j≤max_Iter, and j is a positive integer.

With reference to the second aspect, in some implementations of the second aspect, an input into the soft SCL decoding algorithm includes a list size and a soft information sequence; and an output of the soft SCL decoding algorithm includes a soft information sequence of an encoder-side code word of the polar code and a soft information sequence of a decoder-side code word of the polar code, where a soft information sequence for determining extrinsic information of the SISO decoding algorithm is the soft information sequence of the decoder-side code word of the polar code.

According to a third aspect, a communication apparatus is provided. The communication apparatus has a function of implementing the method in the first aspect or any possible implementation of the first aspect. The function may be implemented by hardware, or may be implemented by hardware executing corresponding software. The hardware or the software includes one or more units corresponding to the foregoing function.

According to a fourth aspect, a communication apparatus is provided. The communication apparatus has a function of implementing the method in the second aspect or any possible implementation of the second aspect. The function may be implemented by hardware, or may be implemented by hardware executing corresponding software. The hardware or the software includes one or more units corresponding to the foregoing function.

According to a fifth aspect, a communication apparatus is provided, includes a processor and a memory, and optionally, may further include a transceiver. The memory is configured to store a computer program, and the processor is configured to: call and run the computer program stored in the memory, and control the transceiver to receive and send a signal, to enable the communication apparatus to perform the method in the first aspect or any possible implementation of the first aspect.

According to a sixth aspect, a communication apparatus is provided, includes a processor and a memory, and optionally, may further include a transceiver. The memory is configured to store a computer program, and the processor is configured to: call and run the computer program stored in the memory, and control the transceiver to receive and send a signal, to enable the communication apparatus to perform the method in the second aspect or any possible implementation of the second aspect.

According to a seventh aspect, a communication apparatus is provided, and includes a processor and a communication interface. The communication interface is configured to: receive data and/or information, and transmit the received data and/or information to the processor. The processor processes the data and/or information. The communication interface is further configured to output the data and/or information processed by the processor, so that the method in the first aspect or any possible implementation of the first aspect is performed.

According to an eighth aspect, a communication apparatus is provided, and includes a processor and a communication interface. The processor processes to-be-sent data and/or information. The communication interface is further configured to output the data and/or information processed by the processor, so that the method in the second aspect or any possible implementation of the second aspect is performed.

According to a ninth aspect, a computer-readable storage medium is provided. The computer-readable storage medium stores computer instructions. When the computer instructions are run on a computer, the method in the first aspect, the second aspect, or any possible implementation of these aspects is performed.

According to a tenth aspect, a computer program product is provided. The computer program product includes computer program code. When the computer program code is run on a computer, the method in the first aspect, the second aspect, or any possible implementation of any one of these aspects is performed.

According to an eleventh aspect, a wireless communication system is provided, and includes the communication apparatus according to the third aspect and/or the communication apparatus according to the fourth aspect.

BRIEF DESCRIPTION OF DRAWINGS

FIG. 8 is a schematic diagram of a decoding procedure at a receive end according to this application;

Figure 22:
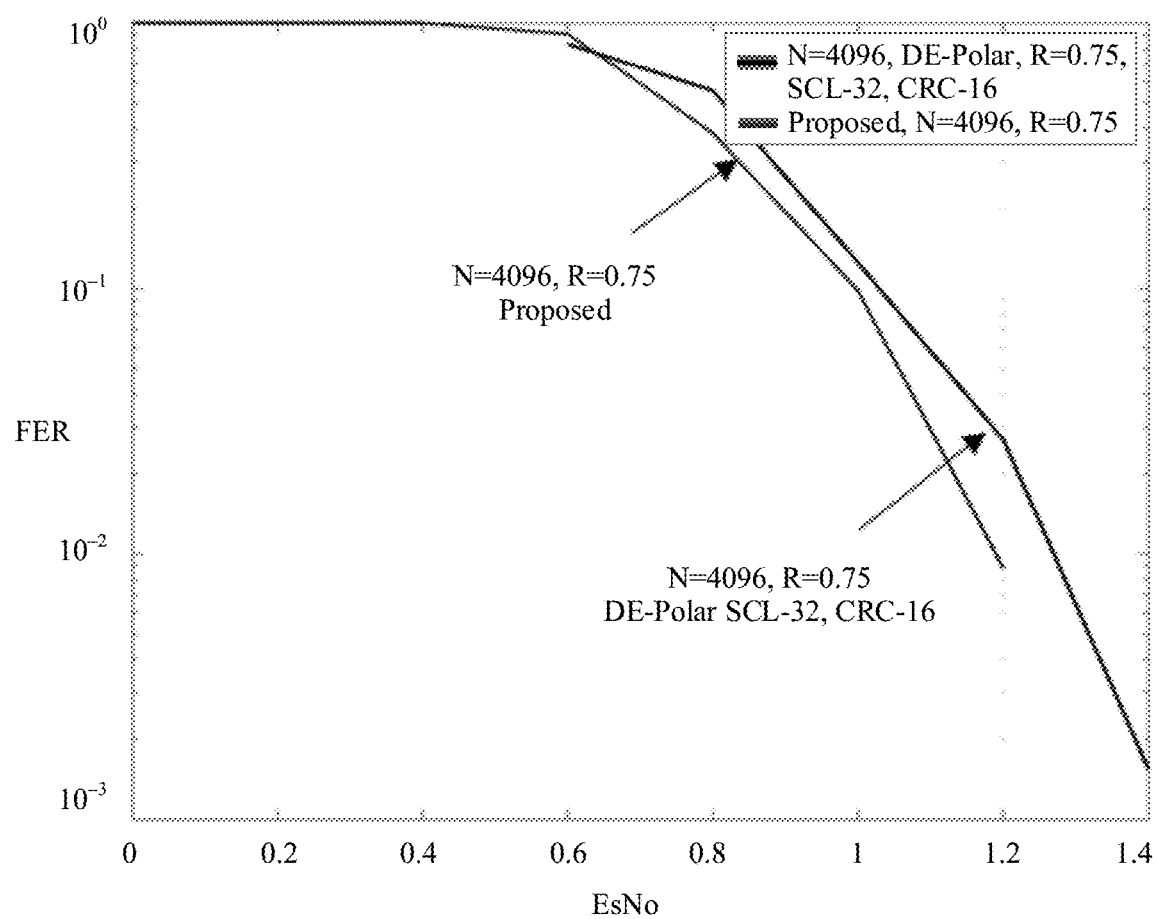
Figure 23:
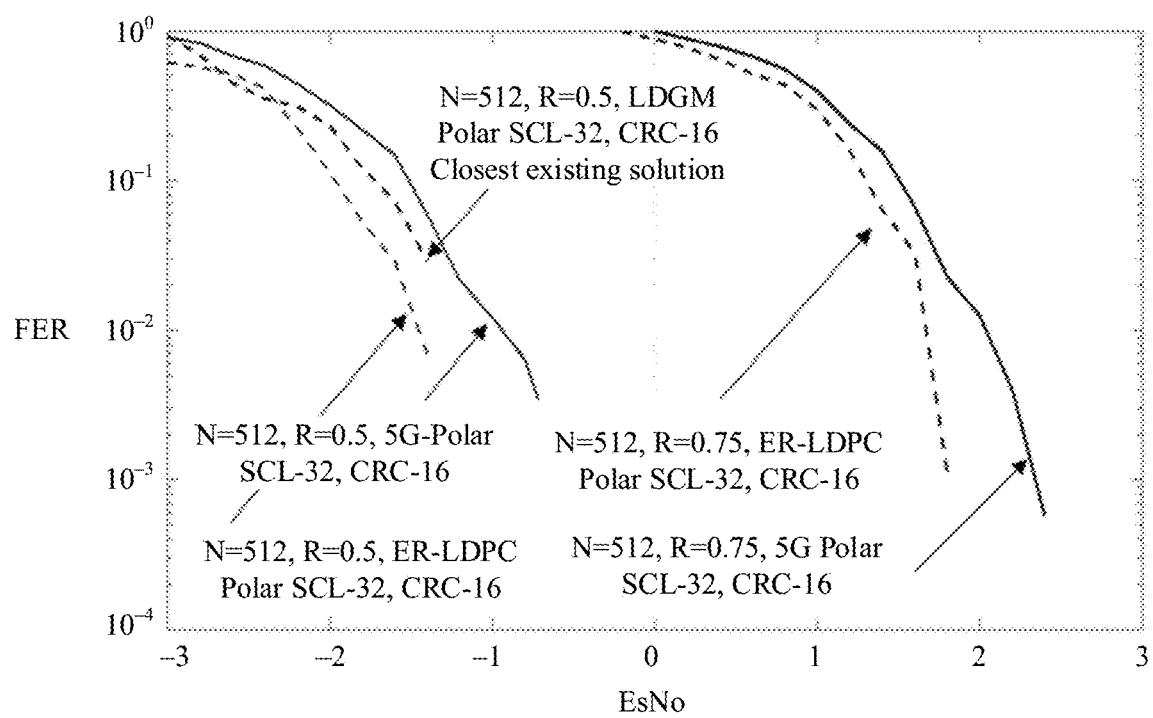
Figure 24:
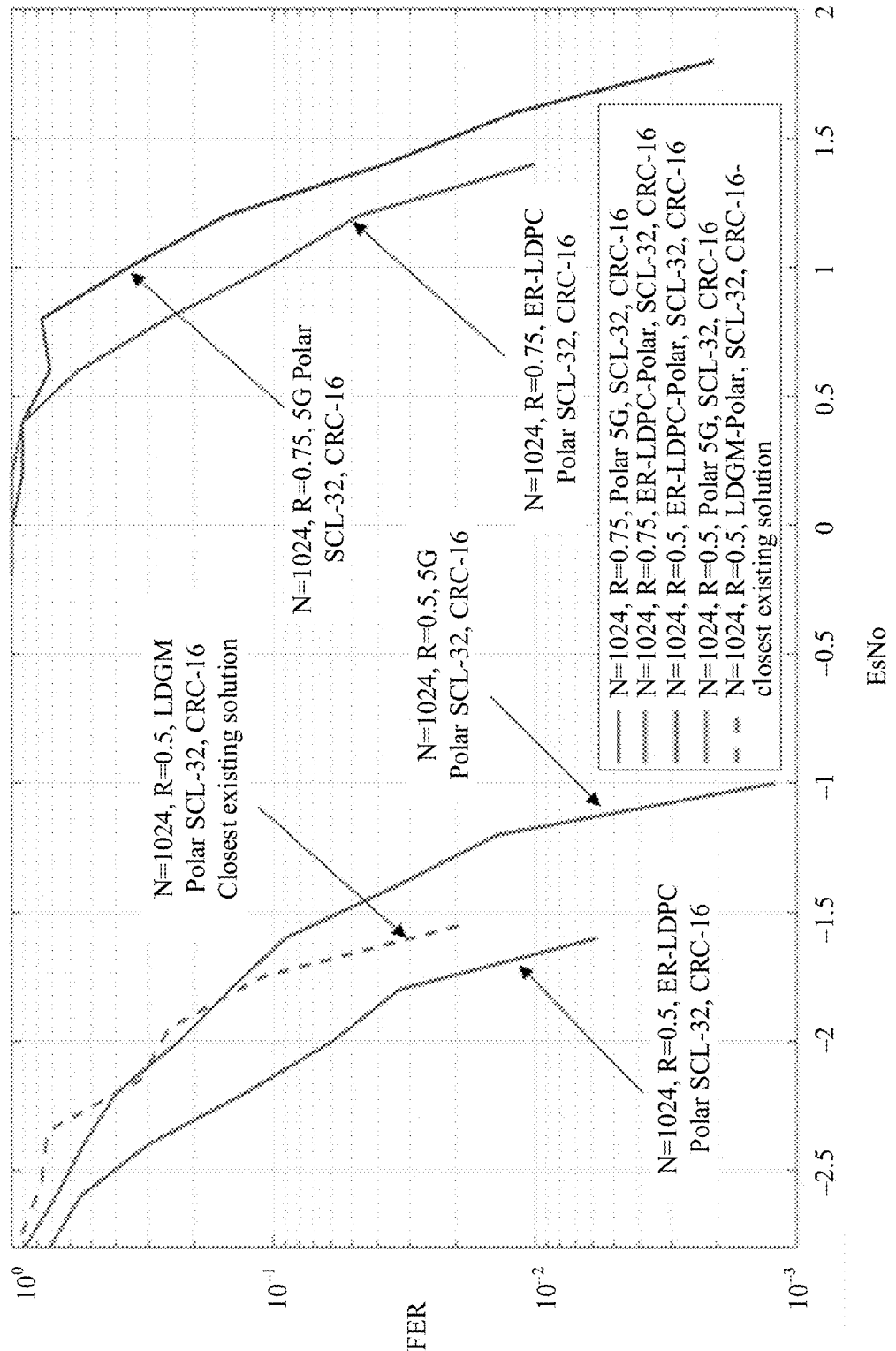
Figure 25:
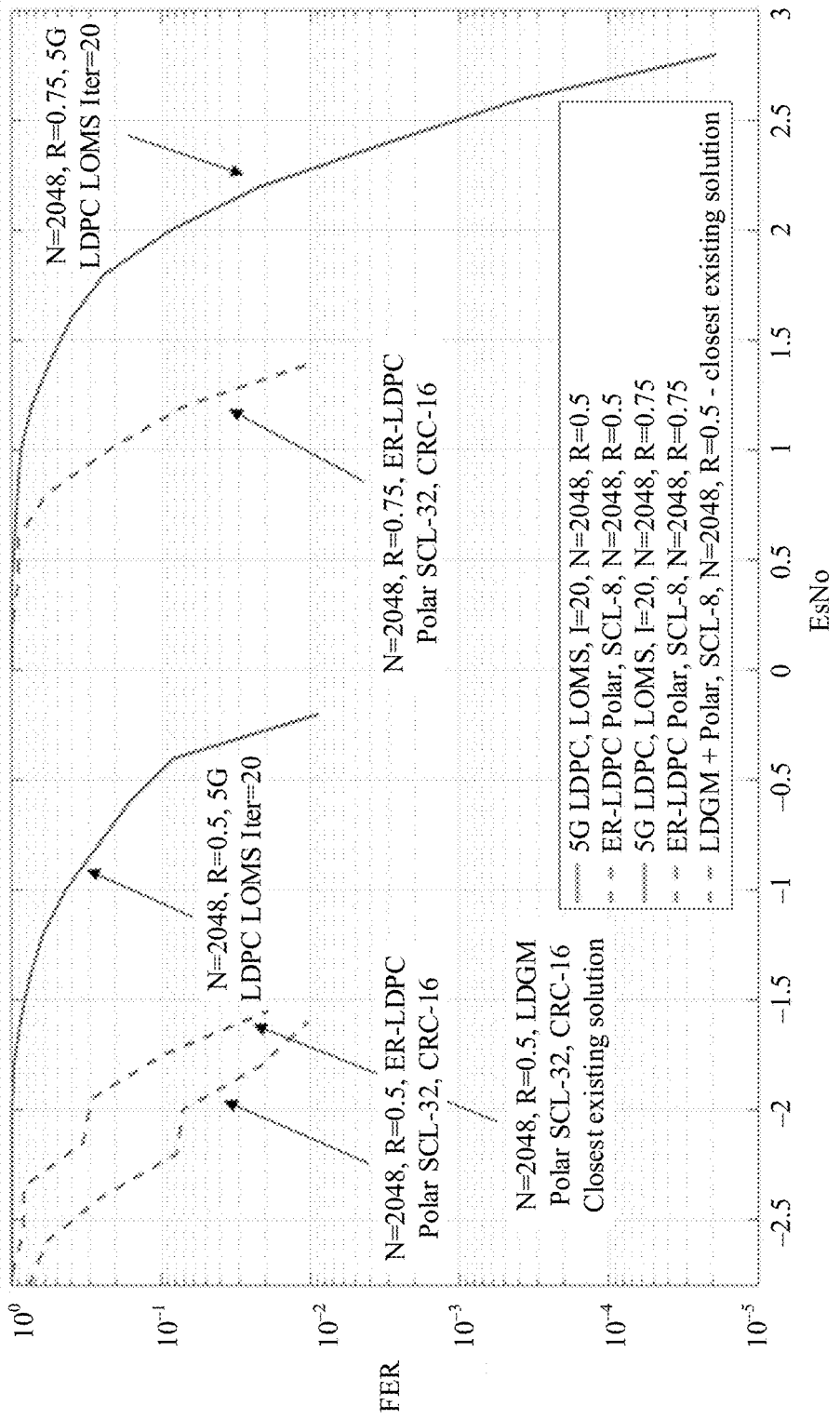
Figure 26:
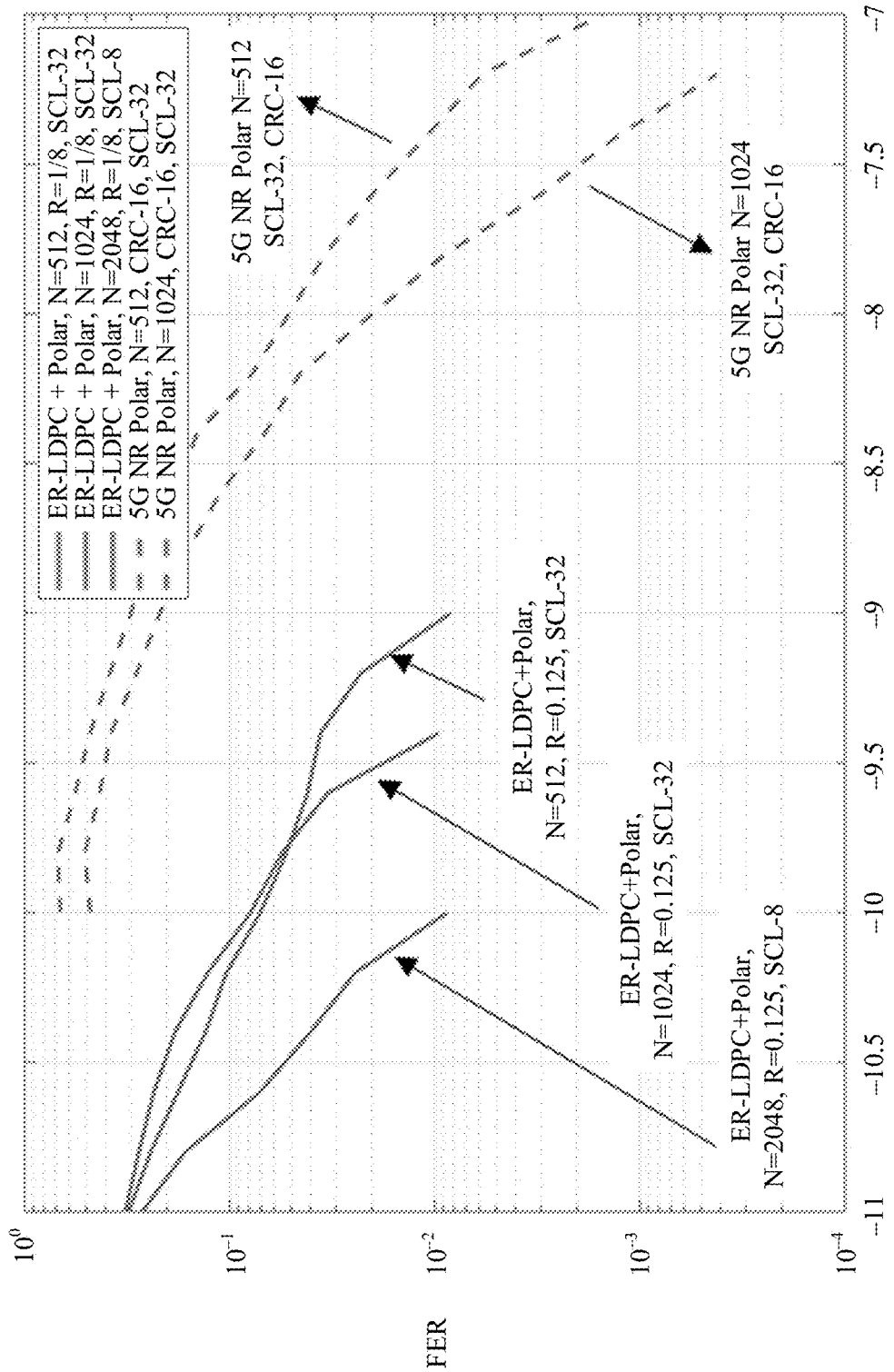
Figure 27:
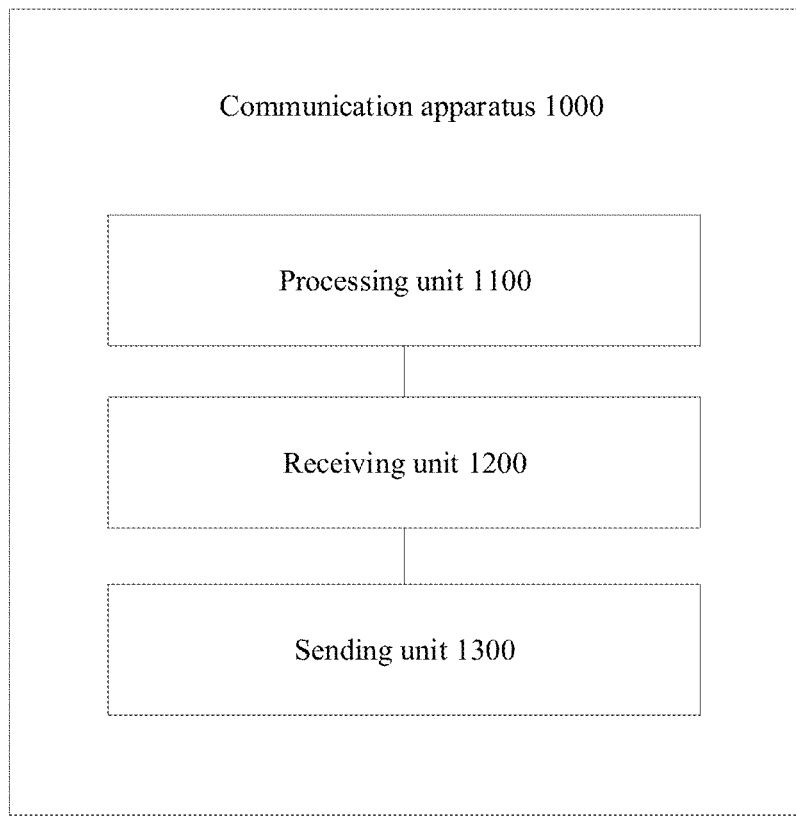
Figure 28:
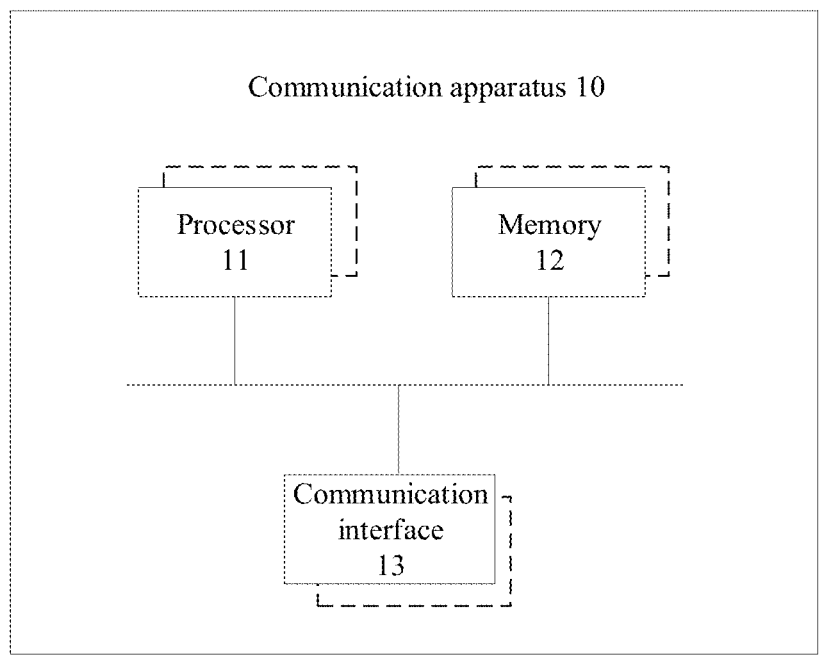

Panel (a) and panel (b) in FIG. 21 show a comparison of decoding performance between an interleaver provided in this application and no interleaver;

FIG. 22 shows a performance comparison between a concatenated code solution provided in this application and an existing concatenated code solution;

FIG. 23 to FIG. 26 show performance comparisons between a concatenated code solution provided in this application and an existing concatenated code solution at other code lengths and code rates;

FIG. 27 is a schematic block diagram of a communication apparatus according to this application; and FIG. 28 is a schematic diagram of a structure of a communication apparatus according to this application.

DESCRIPTION OF EMBODIMENTS

The following describes technical solutions in embodiments of this application with reference to the accompanying drawings.

Terms or related concepts in this application are briefly described first.

Hamming distance: In a code group set, a quantity of locations with different code word values at corresponding locations between any two code words is defined as a Hamming distance between the two code words. For example, a Hamming distance between a code word x and a code word y is d(x, y), that is, d(x, y)=Σx[i]⊕y[i], i=0, 1, ..., n−1, where both x and y are n-bit codes, n is a positive integer, and ⊕ represents an exclusive OR operation. For example, a Hamming distance between (00) and (01) is 1, and a Hamming distance between (110) and (101) is 2.

In a code group set, a minimum value of a Hamming distance between any two codes is referred to as a minimum Hamming distance of this code group, which is also referred to as a minimum Hamming weight. A larger minimum Hamming distance indicates a stronger anti-jamming capability of a code.

Protograph (protograph): A protograph is a representation form of a low-density parity-check (low-density parity-check, LDPC) matrix, and usually has a quasi-cyclic (quasi cyclic, QC) structure.

Soft value (soft value): A soft value is a log-likelihood ratio (log-likelihood ratio, LLR). The LLR of a code word bit c is defined as log (probability of c=0/probability of c=1). When the LLR of c is greater than 0, c is determined as 0 in a hard decision. When the LLR of c is less than 0, c is determined as 1 in a hard decision. This is the function of a symbol of the LLR. In addition, an amplitude of the LLR reflects reliability of the hard decision. A larger absolute value of the LLR indicates a more positive hard decision.

The technical solutions in embodiments of this application may be applied to various communication systems, including but not limited to a satellite communication system, a fifth generation (the 5th generation, 5G) system or a new radio (new radio, NR) system, a long term evolution (long term evolution, LTE) system, an LTE frequency division duplex (frequency division duplex, FDD) system, and an LTE time division duplex (time division duplex, TDD) system. The technical solutions provided in this application may be further applied to a future communication system, for example, a sixth generation mobile communication system. In addition, the technical solutions may be further applied to device-to-device (device-to-device, D2D) communication, vehicle-to-everything (vehicle-to-everything, V2X) communication, machine-to-machine (machine-to-machine, M2M) communication, machine type communication (machine type communication, MTC), and an Internet of things (Internet of things, IoT) communication system or another communication system. This is not limited in this specification.

A communication system applicable to this application may include one or more transmit ends and one or more receive ends. Optionally, one of the transmit end and the receive end may be a terminal device, and the other may be a network device. Alternatively, both the transmit end and the receive end are terminal devices. The transmit end may also be considered as an encoder side or an encoding device. The receive end may also be considered as a decoder side or a decoding device.

For example, the terminal device may also be referred to as user equipment (user equipment, UE), an access terminal, a subscriber unit, a subscriber station, a mobile station, a mobile console, a mobile terminal (mobile terminal, MT), a remote station, a remote terminal, a mobile device, a user terminal, a terminal, a wireless communication device, a user agent, or a user apparatus. The terminal device in embodiments of this application may be a device that provides voice and/or data connectivity for a user, and may be configured to connect a person, an object, and a machine, for example, a handheld device or on-board device with a wireless connection function. The terminal device in embodiments of this application may be a mobile phone (mobile phone), a tablet computer (pad), a notebook computer, a palmtop computer, a mobile Internet device (mobile Internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like. Optionally, the UE may serve as a base station. For example, the UE may serve as a scheduling entity that provides a sidelink signal between UEs in V2X, D2D, or the like.

In embodiments of this application, an apparatus configured to implement a function of the terminal may be a terminal, or may be an apparatus, for example, a chip system or a chip, that can support the terminal in implementing the function. The apparatus may be installed in the terminal. In embodiments of this application, the chip system may include a chip, or may include a chip and another discrete device.

For example, the network device may be a device with a wireless transceiver function. The network device may be a device that provides a wireless communication function service, is usually located on a network side, and includes, but is not limited to, a next-generation base station (gNodeB, gNB) in a fifth generation (5th generation, 5G) communication system, a base station in a sixth generation (6th generation, 6G) mobile communication system, a base station in a future mobile communication system or an access node in a wireless fidelity (wireless fidelity, Wi-Fi) system, an evolved NodeB (evolved NodeB, eNB) in a long term evolution (long term evolution, LTE) system, a radio network controller (radio network controller, RNC), a NodeB (NodeB, NB), a base station controller (base station controller, BSC), a home base station (for example, a home evolved NodeB or a home NodeB, HNB), a baseband unit (baseband unit, BBU), a transmission reception point (transmission reception point, TRP), a transmitting point (transmitting point, TP), and a base transceiver station (base transceiver station, BTS). In a network structure, the network device may include a central unit (central unit, CU) node, a distributed unit (distributed unit, DU) node, a RAN device including a CU node and a DU node, or a RAN device including a control plane CU node, a user plane CU node, and a DU node. Alternatively, the network device may be a radio controller, a relay station, an on-board device, a wearable device, or the like in a cloud radio access network (cloud radio access network, CRAN) scenario. In addition, the base station may be a macro base station, a micro base station, a relay node, a donor node, or a combination thereof. The base station may alternatively be a communication module, a modem, or a chip that is disposed in the foregoing device or apparatus. The base station may alternatively be a device that bears a base station function in a mobile switching center and D2D, V2X, and M2M communication, a network side device in a 6G network, a device that bears a base station function in a future communication system, or the like. The base station may support networks of a same access technology or different access technologies. This is not limited.

In embodiments of this application, an apparatus configured to implement a function of the network device may be a network device, or may be an apparatus, for example, a chip system or a chip, that can support the network device in implementing the function. The apparatus may be installed in the network device. In embodiments of this application, the chip system may include a chip, or may include a chip and another discrete device.

It should be understood that a concatenated code encoding/decoding scheme provided in this application, that is, a channel encoding/decoding scheme, may be applied to a dedicated network device or a general-purpose device, may be applied to the foregoing network devices (for example, a base station device), or may be applied to the foregoing terminal devices. Specifically, the channel encoding/decoding scheme is mainly implemented by a channel encoding unit or a channel decoding unit in these devices.

In embodiments of this application, a function of the transmit end or the receive end may be implemented by a dedicated chip ASIC, a programmable chip FPGA, or the like, or may be implemented by software (for example, program code in a memory). This is not limited.

Figure 1:
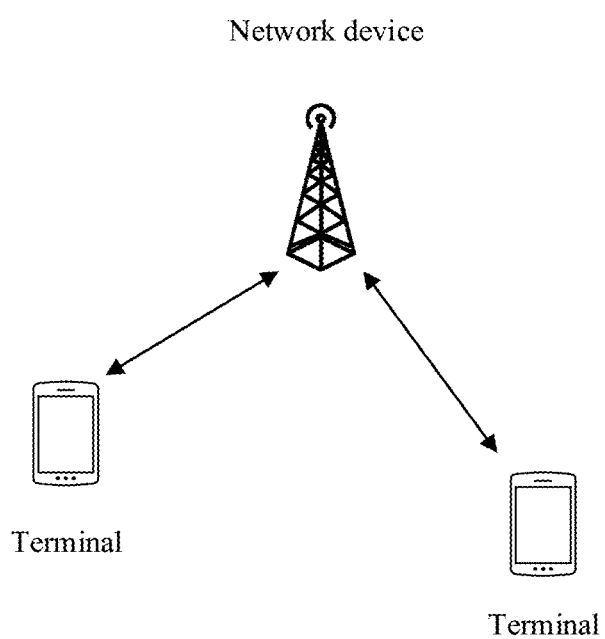
FIG. 1 is a schematic diagram of a system architecture of a communication system applicable to a technical solution of this application.

In addition, the technical solutions in this application may be applied to various communication scenarios. FIG. 1 is a schematic diagram of a system architecture of a communication system applicable to a technical solution of this application.

In an example shown in FIG. 1, a concatenated code encoding method and a concatenated code decoding method that are provided in this application are applicable to communication, that is, uplink or downlink communication, between a network device and a terminal. In this communication scenario, in this specification, the transmit end may be a terminal in the uplink communication or a network device in the downlink communication, and the receive end may be a network device in the uplink communication or a terminal in the downlink communication. In addition, optionally, the technical solution of this application may also be applied to sidelink communication. In this communication scenario, the transmit end is a transmit terminal in the sidelink communication, and the receive end is a receive terminal in the sidelink communication. Moreover, the technical solution may be further applied to another communication scenario. Details are not described again.

Figure 2:
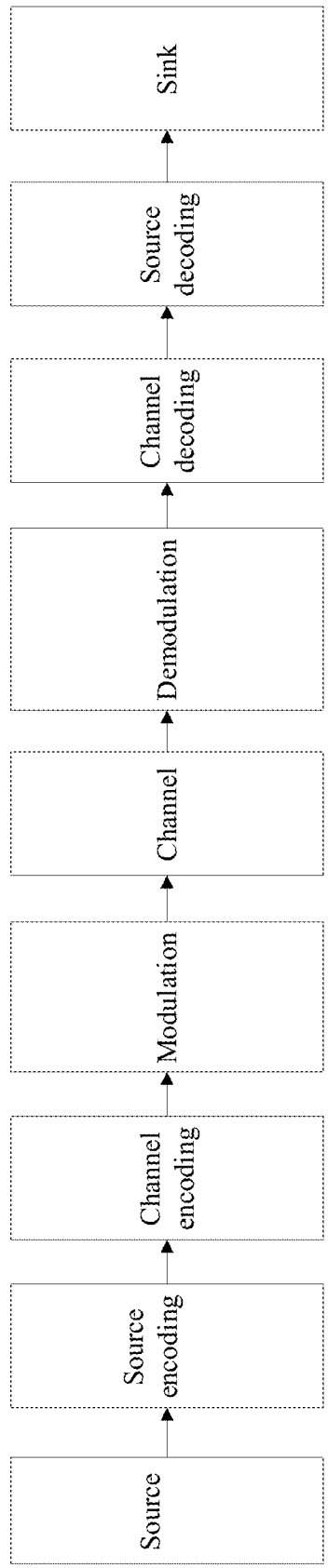
FIG. 2 is a schematic diagram of a procedure of a communication system.

FIG. 2 is a schematic flowchart of a communication system. As shown in FIG. 2, channel encoding is between source encoding and modulation, and is responsible for performing channel encoding on bits generated by a source. After modulation, a modulated symbol is sent to a receive end through a noisy channel for demodulation, and then channel decoding is performed. Channel decoding is between demodulation and source decoding, and is responsible for restoring a source bit stream.

The technical solution of this application relates to a polar code, an LDPC code, and a concatenated code in the field of encoding.

Figure 3:
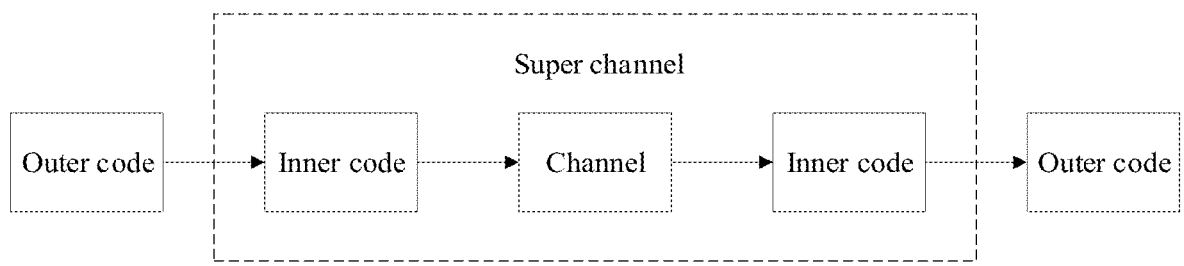
FIG. 3 is a schematic diagram of concatenated encoding.

FIG. 3 is a schematic diagram of concatenated encoding. As shown in FIG. 3, a concatenated encoding policy usually includes an inner code and an outer code. It may be considered that a function of the inner code is to perform "noise reduction" on a physical channel to obtain a better super channel, so that a channel condition provided for the outer code is better than that of the original physical channel. Previous studies have shown that a concatenated code can reduce a block error rate (block error rate, BLER) at all code rates below channel capacity.

In this specification, the outer code and the inner code of the concatenated code are respectively represented by $C_{out}(n_o,k_o,d_o)$ and $C_{in}(n_i,k_i,d_i)$, and the concatenated code is represented by $C(N,K,D)$, where $N=n_o*n_i$, $K=k_o*k_i$, and $D \geq d_o*d_i$. The parameter n in the brackets represents a code length, k represents a message bit quantity, and d represents a minimum Hamming distance of the code. In this application, it is not required that both the inner and outer code words are in a same algebraic field. The inner code may be in a binary field, and the outer code may be in another non-binary field. In addition, if both the inner code and the outer code are linear codes, a code word after concatenation is also a linear code.

Decoding of the concatenated code is implemented usually by iterative soft input soft output (soft input soft output, SISO) decoding. The iterative SISO decoding is sometimes referred to as turbo decoding (turbo decoding). The essence of this decoding mode is to use a soft output of the first decoder as a soft input into the second decoder, and then use a soft output of the second decoder as a soft input into the first decoder. Such cyclic iteration eventually produces a more reliable decision result.

There are many methods for concatenating different code words. According to the concatenation methods, the code words may be roughly classified into serial concatenated codes and parallel concatenated codes. Currently, the concatenated code has the following solutions:

(1) Polar code+LDPC code serial concatenation policy.
(2) Parallel concatenation policy by concatenating a polar code and an LDPC code using a parallel concatenated code (parallel concatenated code, PCC) architecture.
(3) RS code+interleaver+polar code concatenation policy.
(4) Polar code+low-density generator matrix (low-density generation matrix, LDGM) concatenation policy.

In conclusion, the foregoing several solutions of the concatenated code generally have the following disadvantages: low decoding performance and inflexible construction.

To resolve the foregoing disadvantages, this application provides encoding and decoding solutions of a concatenated code of a polar code and an optimized LDPC code provided in this application, to further improve decoding performance and construction flexibility of the concatenated code.

The "optimized LDPC code" mentioned in this application is provided in this application, and is different from a conventional LDPC code. Compared with the conventional LDPC code, the optimized LDPC code can further reduce a bit error rate BER. Therefore, in this specification, the optimized LDPC code is also referred to as an error reduction LDPC (error reduction LDPC, ER-LDPC) code.

The following describes the technical solutions of this application.

The concatenated encoding and decoding methods provided in this application involve the following aspects:

1. Concatenated code encoding solution and soft information iterative decoding solution.
2. Construction of ER-LDPC code (inner code of concatenated code).

Specifically, the construction of the ER-LDPC code involves design of a basis matrix of the ER-LDPC code and design of a lifting matrix of the basis matrix.

3. Optimized construction of polar code (outer code of concatenated code).

Specifically, the polar code is optimally designed in combination with the ER-LDPC code.

4. Design of interleaver of concatenated code.

The following describes the foregoing aspects one by one.

1. Concatenated code encoding solution and soft information iterative decoding solution.

Figure 4:
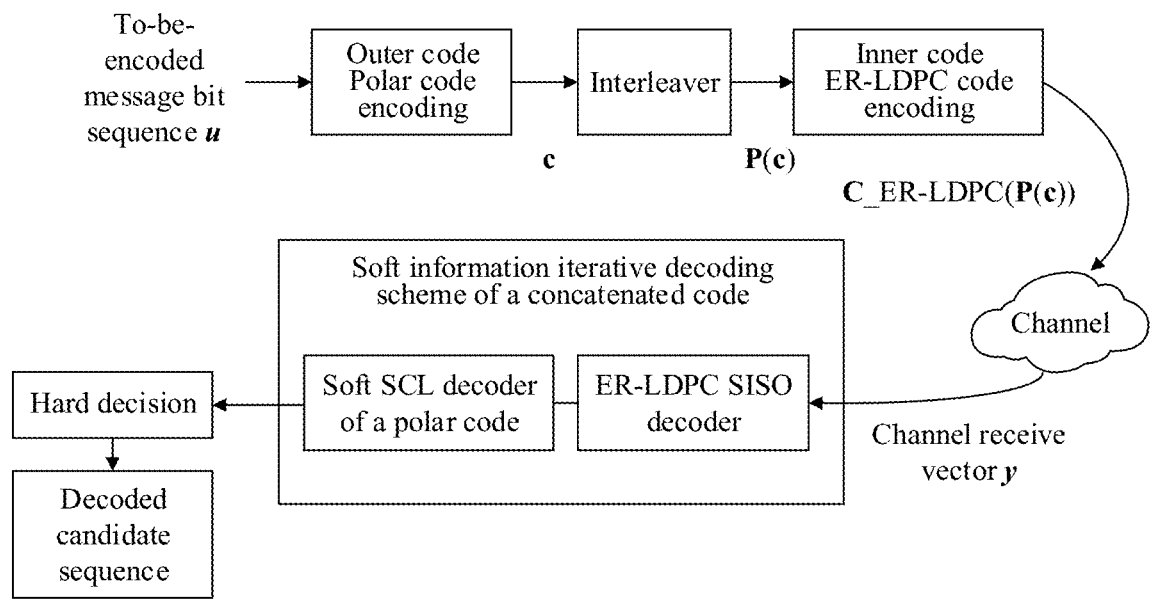
FIG. 4 is a schematic diagram of a concatenated code encoding method and a concatenated code decoding method according to this application.

FIG. 4 is a schematic diagram of a concatenated code encoding method and a concatenated code decoding method according to this application. As shown in FIG. 4, a transmit end first obtains a code word c from a to-be-encoded message bit sequence u through a polar code encoder, and then obtains an input sequence P (c) of an ER-LDPC code encoder through an interleaver P. ER-LDPC code encoding is performed on P (c) to obtain a final concatenated code word C_LDPC (P (c)), and then the concatenated code word is sent to a channel for transmission.

At a receive end, soft information iterative decoding is implemented at the receive end.

The receive end receives a channel receive vector y, and then performs decoding on the channel receive vector y according to the soft information iterative decoding solution of the concatenated code provided in this application. A soft information sequence outputted by a soft SCL decoder is obtained through soft information iterative decoding based on a preset maximum iteration quantity of times, and a final decoded candidate sequence is obtained through a hard decision.

Specifically, an ER-LDPC decoder first performs decoding on a sequence received from the channel (referred to as a channel receive sequence below), to obtain soft information. The soft information is used as an input into the soft SCL decoder, and then decoding is performed by the soft SCL decoder to generate a soft value of a decoded sequence. Then, the input is subtracted from the soft value to obtain extrinsic information, and the extrinsic information is inputted into the ER-LDPC decoder for decoding together with the channel receive sequence, to generate new soft information. To generate prior information of the soft SCL decoder in a next round of iteration, the input needs to be subtracted from the soft information outputted by the ER-LDPC decoder in this round of iteration to obtain extrinsic information, and then the extrinsic information is inputted to the soft SCL decoder for decoding, to generate a new soft value of a decoded sequence. The iteration is repeated in such a way. After the maximum iteration quantity of times is reached, a hard decision is performed on the soft value of the decoded sequence generated by the soft SCL decoder, to obtain a final candidate sequence.

The following describes in detail a channel encoding solution at a transmit end and a channel decoding solution at a receive end.

Figure 5:
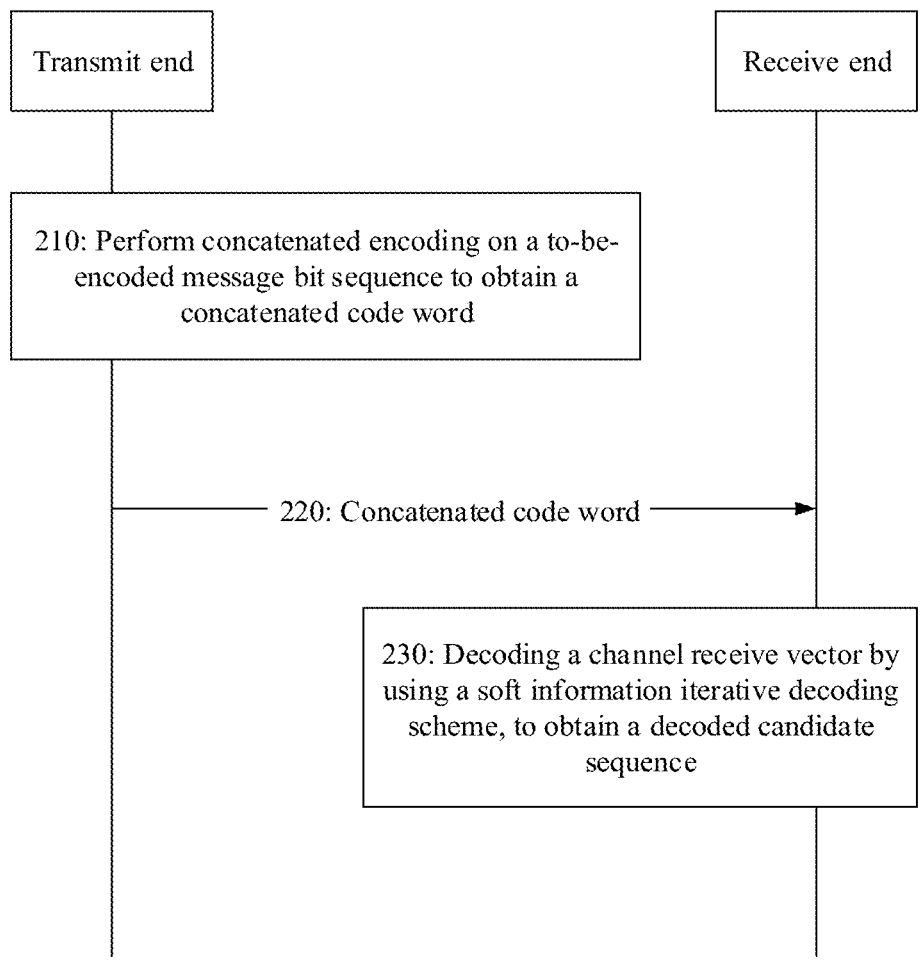
FIG. 5 is a schematic flowchart of a concatenated code encoding method and a concatenated code decoding method according to this application.

FIG. 5 is a schematic flowchart of a concatenated code encoding method and a concatenated code decoding method according to this application.

210: The transmit end performs concatenated encoding on a to-be-encoded message bit sequence to obtain a concatenated code word.

Figure 6:
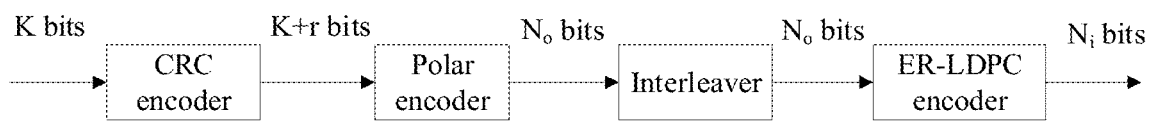
FIG. 6 is a schematic diagram of a concatenated code encoding procedure according to this application.
Figure 7:
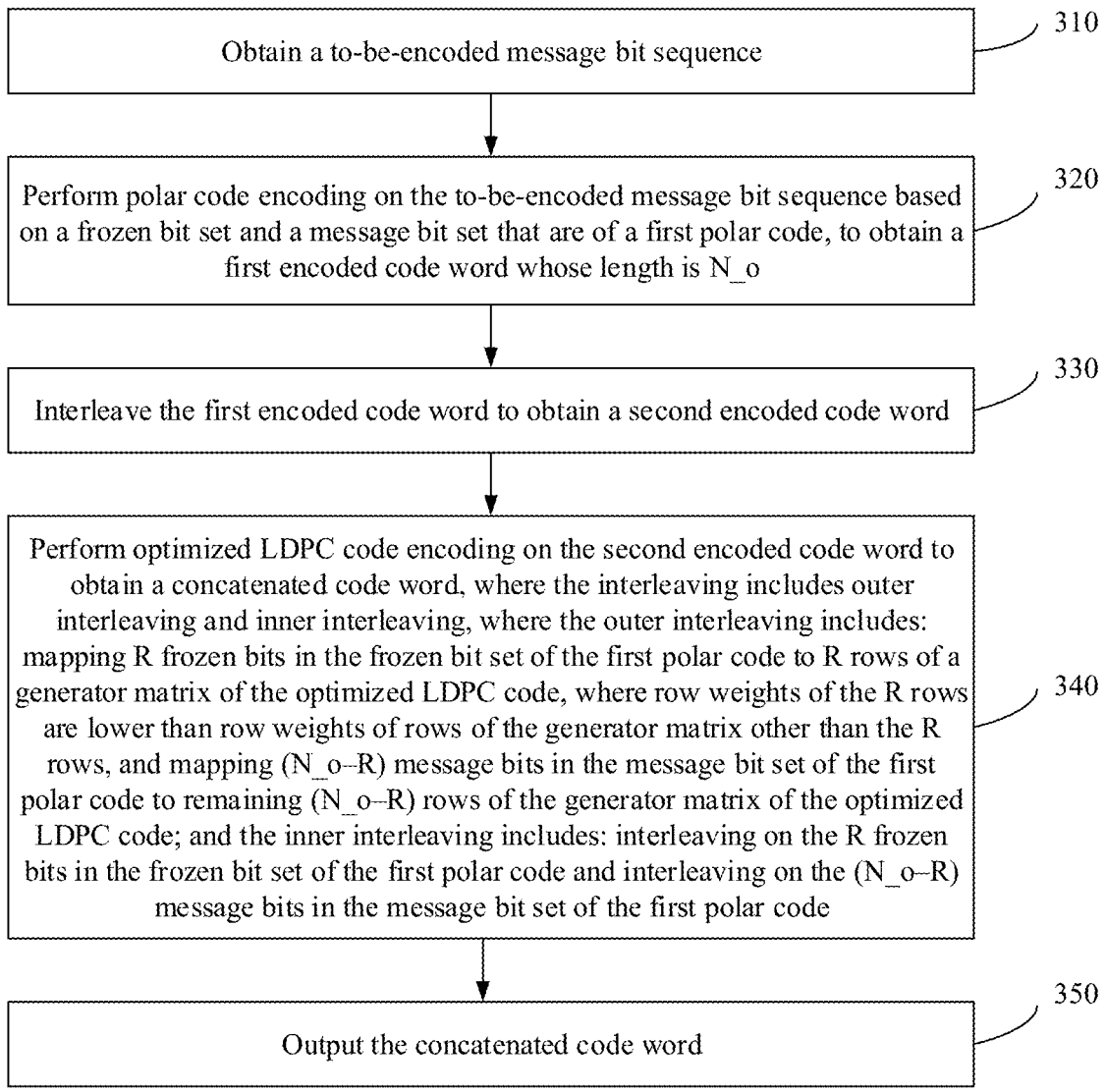
FIG. 7 is a schematic diagram of an encoding procedure at a transmit end according to this application.

For a detailed description of step 210, refer to further descriptions in FIG. 6 and FIG. 7.

220: The transmit end sends the concatenated code word.

The receive end receives a channel receive vector (also referred to as a channel receive sequence).

230: The receive end performs decoding on the channel receive vector by using a soft information iterative decoding solution, to obtain a decoded candidate sequence.

The soft information iterative decoding solution used in this application is a soft information iterative decoding algorithm that combines a soft SCL decoding algorithm and a BP decoding algorithm, which has low decoding complexity.

Figure 9:
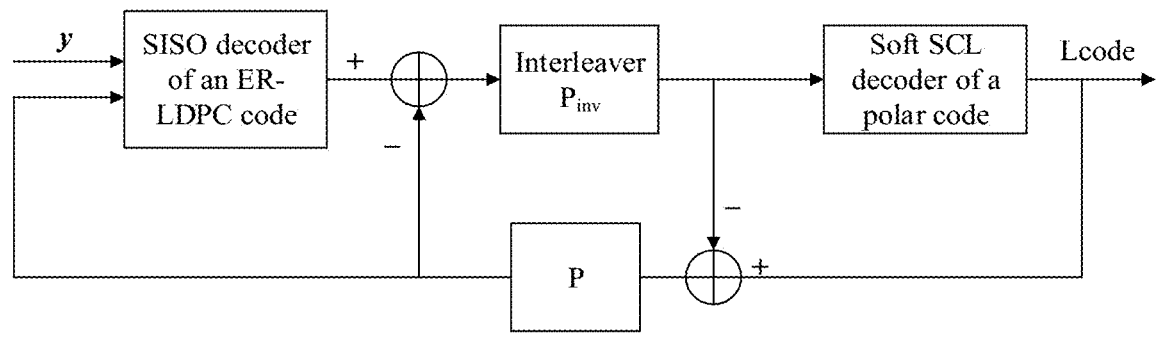
FIG. 9 is a schematic diagram of a soft information iterative decoding scheme at a receive end according to this application.

For a detailed description of step 230, refer to detailed descriptions in FIG. 8 and FIG. 9.

FIG. 6 is a schematic diagram of a concatenated code encoding procedure according to this application. As shown in FIG. 6, a main procedure of concatenated encoding at a transmit end may be as follows:

(1) Give a message bit sequence u=(u_1,u_K) of a concatenated code;

(2) Add r CRC check bits to the message bit sequence u to obtain a sequence whose length is K+r;

(3) Perform polar outer code encoding on the sequence whose length is K+r to obtain an inner code whose code length is N_o and whose message bit quantity is K_o, that is, obtain a polar code word C_o, where K_o=K+r, and N_o=K_i;

(4) Interleave C_o to obtain an interleaved code word P (C_o), where a length of an interleaver is N_o; and (5) Perform ER-LDPC encoding on the code word P (C_o) to obtain a final concatenated code word whose length is N_i.

FIG. 7 is a schematic diagram of an encoding procedure at a transmit end according to this application.

310: The transmit end obtains a to-be-encoded message bit sequence (also referred to as an information bit sequence).

320: The transmit end performs polar code encoding on the to-be-encoded message bit sequence based on a frozen bit set and an information bit set that are of a first polar code, to obtain a first encoded code word whose length is N_o.

It should be understood that, after step 320, the transmit end completes outer code encoding of a concatenated code, and the first encoded code word is a polar code word or an outer code word.

Herein, the first polar code is a target polar code, and a method for obtaining the target polar code is described in detail below.

330: The transmit end interleaves the first encoded code word to obtain a second encoded code word.

340: The transmit end performs optimized LDPC code encoding on the second encoded code word to obtain a concatenated code word.

The interleaving in step 330 includes outer interleaving and inner interleaving.

Specifically, through the outer interleaving, R frozen bits in the frozen bit set of the first polar code are mapped to R rows of a generator matrix of the optimized LDPC code, where row weights of the R rows are lower than or equal to row weights of rows of the generator matrix other than the R rows, and (N_o-R) message bits in the message bit set of the first polar code are mapped to remaining (N_o-R) rows of the generator matrix of the optimized LDPC code other than the R rows.

In other words, if row indexes of the generator matrix form a set, and the row indexes in the set are sorted in ascending order of row weight, through the outer interleaving, the R frozen bits in the frozen bit set of the first polar code are mapped to R rows corresponding to first R row indexes in the set, and the (N_o-R) message bits in the message bit set of the first polar code are mapped to remaining (N_o-R) rows in the set.

The inner interleaving includes: interleaving on the R frozen bits in the frozen bit set of the first polar code and interleaving on the (N_o-R) message bits in the message bit set of the first polar code.

In other words, in a case that the R frozen bits in the frozen bit set of the first polar code are mapped to the R rows of the generator matrix of the optimized LDPC code, and the (N_o-R) message bits in the message bit set of the first polar code are mapped to the remaining (N_o-R) rows of the generator matrix, the inner interleaving is interleaving on a mapping relationship between the R frozen bits and the R rows, and/or interleaving on a mapping relationship between the (N_o-R) message bits and the remaining (N_o-R) rows.

350: The transmit end outputs the concatenated code word.

FIG. 8 is a schematic diagram of a decoding procedure at a receive end according to this application.

510: The receive end obtains a channel receive vector whose length is $N_i$.

$N_i$ is a length of an inner code of a concatenated code, the inner code of the concatenated code is an optimized LDPC code, an outer code of the concatenated code is a polar code (specifically the foregoing first polar code), and $N_i$ is a positive integer.

520: The receive end performs decoding on the channel receive vector by using a SISO decoding algorithm of the optimized LDPC code, to obtain a first soft information sequence whose length is $N_i$.

It should be understood that the "soft information" or "soft value" in this application refers to an LLR. For example, the length of the first soft information sequence is $N_i$, that is, the first soft information sequence includes $N_i$ LLRs. The $N_i$ LLRs are obtained by decoding the channel receive vector y by using a SISO decoder of the optimized LDPC code.

An iteration quantity of times of the SISO decoder is denoted as inner_iter.

530: The receive end de-interleaves the first soft information sequence to obtain a de-interleaved first soft information sequence, and extracts soft information at first N_o locations in the de-interleaved first soft information sequence to obtain a second soft information sequence, where N_o is a length of the outer code of the concatenated code, and N_o is a positive integer.

It should be understood that, in step 530, the receive end completes de-interleaving on the first soft information sequence, and reads the soft information at the first N_o locations from the de-interleaved first soft information sequence, that is, obtains the soft information sequence of the polar outer code.

540: The receive end performs soft information iterative decoding by using a soft SCL decoding algorithm of the polar code and the SISO decoding algorithm of the ER-LDPC code based on the second soft information sequence, the channel receive vector, and a preset maximum iteration quantity of times of the concatenated code, to obtain a third soft information sequence.

In step 540, at the receive end, by the soft information iterative decoding in this application, after the preset maximum iteration quantity of times max_Iter is reached, a soft SCL decoder outputs the third soft information sequence, that is, a soft value sequence of a decoded sequence.

Specifically, using any two adjacent iteration processes as an example, a process of the soft information iterative decoding includes the following steps:

performing soft information iterative decoding (j−1) times to obtain a $(j-1)^{th}$ soft information sequence outputted by the soft SCL decoding algorithm;

subtracting a soft information sequence inputted by the soft SCL decoding algorithm in a $(j-1)^{th}$ soft information iterative decoding process from the $(j-1)^{th}$ soft information sequence, to obtain a $j^{th}$ piece of extrinsic information of the SISO decoding algorithm;

using the $j^{th}$ piece of extrinsic information and the channel receive vector as an input into the SISO decoding algorithm in a $j^{th}$ soft information iterative decoding process, to obtain an output of the SISO decoding algorithm in the $j^{th}$ soft information iteration process; and using the output of the SISO decoding algorithm in the $j^{th}$ soft information iteration process as prior information of the soft SCL decoding algorithm in the $j^{th}$ soft information iterative decoding process, to obtain a $j^{th}$ soft information sequence of the soft SCL decoding algorithm, where the $j^{th}$ soft information sequence of the soft SCL decoding algorithm is a soft information sequence outputted by the soft SCL decoding algorithm in the $j^{th}$ soft information iteration process;

the $j^{th}$ piece of extrinsic information of the SISO decoding algorithm is extrinsic information inputted to the SISO decoding algorithm in the $j^{th}$ soft information iteration process;

the second soft information sequence is a soft information sequence inputted to the soft SCL decoding algorithm in a first soft information iteration process, and the third soft information sequence is a soft information sequence outputted by the soft SCL decoding algorithm in a last soft information iteration process; and 1<j≤max_Iter, and j is a positive integer.

550: The receive end performs a hard decision on the third soft information sequence to obtain a decoded candidate sequence.

560: The receive end outputs the decoded candidate sequence.

The following describes in detail a process in which the receive end performs soft information iterative decoding with reference to FIG. 9.

FIG. 9 is a schematic diagram of a soft information iterative decoding scheme at a receive end according to this application.

As shown in FIG. 9, the process in which the receive end performs soft information iterative decoding is as follows:

(1) A channel receive vector y=(y_1, . . . , y_$N_i$) is first sent to a SISO decoder of ER-LDPC for decoding. An iteration quantity of times of the SISO decoder is inner_iter. An outputted decoded soft message has a length of N_i, and is denoted as a sequence d=(d_1, . . . , d_$N_i$).

(2) A de-interleaver, that is, P_inv, corresponding to an encoder-side interleaver P is found.

(3) First N_o values of the sequence d of the length N_i that is obtained by decoding are extracted to obtain a soft information sequence L_polar=P_inv ($L_{ER\text{-}LDPC\_No}$=(L_1, . . . , L_$_{No}$)) of a polar outer code.

(4) The following loop is executed:

for i=1: max_Iter (a) [L_out, L_code]=soft_SCL (L_polar, List):

A soft_SCL decoder performs decoding on the polar code to obtain two outputs L_out and L_code. L_out is a message soft value at a U side of the polar code, and L_code is a code word soft value at a C side of the polar code.

The soft SCL decoder has two inputs: P_inv ($L_{ER\text{-}LDPC\_No}$) and List. P_inv($L_{ER\text{-}LDPC\_No}$) is a soft value required for decoding of the polar outer code. The soft value is equal to a soft value sequence obtained after de-interleaving is performed on the first N_o messages of the soft value outputted by ER-LDPC decoding. List is a size of a decoding list, and is a power of 2, such as 1, 2, 4, 8, 16, or 32.

(b) Extrinsic information (soft value) sent to the ER-LDPC decoder is calculated. A length of the extrinsic information is equal to a length of the channel receive vector and is also N_i bits, except that values of N_i-N_o non-systematic bits are 0. Only values at N_o locations are equal to (P(L_code)–L_polar), that is, N_o non-zero elements are equal to a result obtained by subtracting the first input from the second output (interleaved) of the soft_SCL decoder. A vector of the extrinsic information is denoted as E=[P (L_code)–L_polar; 0000 . . . 0 (N_i-N_o zeros in total)].

(c) SISO decoding is performed on ER-LDPC again. This time, in addition to the channel receive vector y=(y_1, . . . , y_N_i) whose length is N_i, the vector E of the extrinsic information obtained in step (b) needs to be added to the input into the SISO decoder, then L_d=soft LDPC decode (y+E, inner_iter).

(d) Soft values at first N_o locations of ER-LDPC are extracted, and then the input into the ER-LDPC decoder is subtracted to generate an input in a next round of polar soft SCL decoding.

In conclusion, the soft information iterative decoding procedure involves two decoders: the soft SCL decoder of the polar code (that is, the outer code of the concatenated code) and the decoder of the ER-LDPC code (that is, the inner code of the concatenated code).

The foregoing describes in detail the concatenated code encoding method and the concatenated code decoding method that are provided in this application.

2. Construction of ER-LDPC Code.

The construction of the ER-LDPC code involves design of a basis matrix and design of a lifting matrix that are of the ER-LDPC code.

(1) Construction of Basis Matrix

A basis matrix of a check matrix of the ER-LDPC code provided in this application is significantly different from a basis matrix of a check matrix of common LDPC. The check matrix of the ER-LDPC code does not have an error correction capability (that is, BLER=1), but has good BER performance. Therefore, in this application, when the check matrix of ER-LDPC is designed, the BER instead of the BLER is optimized.

Optionally, the ER-LDPC code may be defined by using a check matrix, or may be defined by using a generator matrix, or may be defined by using a protograph (that is, a basis matrix) and a lifting matrix (lifting matrix) corresponding to the protograph.

For example, in this application, the ER-LDPC code is defined by using a basis matrix and a corresponding lifting matrix.

For example, an idea of constructing the basis matrix of the ER-LDPC code is as follows:

Input Parameters:
$H_{init}$: a to-be-optimized basis matrix of the ER-LDPC code, which usually has a small dimension. The dimension of the basis matrix may be extended by lifting (lifting).
p: a factor by which the basis matrix needs to be extended, that is, a lifting size (lifting size).
$LF(H_c, p)$: an algorithm for extending a core matrix He to a matrix with a larger dimension through a p×p circulant (circulant).
$Dec_{LDPC}$: an LDPC decoder.
Params: parameters of the LDPC decoder, such as an iteration quantity of times, an extension factor, and a bias array.
$[SNR_{min}, SNR_{max}]$: an SNR optimization range considered in a search process.
$[BER_{min}, BER_{max}]$: a BER optimization range considered in a search process.
$Flips_{max}$: a maximum quantity of elements flipped in an attempt.
Iters: a maximum quantity of attempts.
$O_{ptiter}$: an iteration quantity of times required for internal optimization.

Output Parameters:
$H_{opt}^{proto}$: an outputted optimal basis matrix of the ER-LDPC code.
$H_{opt}^{full}$: an outputted optimal full matrix of the ER-LDPC code, that is, a matrix obtained after $H_{opt}^{proto}$ is lifted.

For example, a subfunction OptStep is provided first, and an objective of the subfunction OptStep($SNR_{array}$, $BER_{array}$, $Opt_{iter}$) is to find a minimum SNR required to reach a target BER. This subfunction is a recursive function, which finds a current SNR range through linear interpolation.

Therefore, [SNRs, BERs]=OptStep (H, $[SNR_{min}, SNR_{max}]$, $[BER_{min}, BER_{max}]$, $Opt_{iter}$).

1. $BER_{array}=Dec_{LDPC}$(H, $SNR_{array}$, Params).
2. Find a sequence number set B=$BER_{array}$ ($BER_{array} \leq$ max {$BER_{input}$}), where $BER_{input}$ is a currently inputted BER range.
3. Find a sequence number set A=$BER_{array}$ ($BER_{array} \geq$ min {$BER_{input}$}), where $BER_{input}$ is a currently inputted BER range.
4. If B is an empty set (indicating that the current SNR range is low), then:
   EsNo=Inf
   BER=1
   Break
5. If A is an empty set (indicating that the current SNR range is high), then:
   EsNo=–Inf
   BER=0
   Break
6. If neither A nor B is an empty set, then:
   (a) I=Index (A \B)
   (b) EsNo=$SNR_{array}$(I)
   (c) BER=$BER_{array}$ (I)
   (d) If $O_{ptiter}$=1 then.
      EsNo=$SNR_{array}$(B(1))
      BER=$BER_{array}$(A(end))
      Break
   (e) Else:
      $SNR_{array}$=LinearDychotomy ($SNR_{array}$(A (end)), $SNR_{array}$(B(1)), Divide)
      (where the function LinearDychotomy is a linear function that divides a range between two given points)
      $BER_{array}$=[$BER_{array}$ (A (end)) . . . $BER_{array}$(B(1))]
      Continue to recursively call OptStep ($SNR_{array}$, $BER_{array}$, $Op_{titer}$–1)

The following describes a main process of optimizing the basis matrix of the ER-LDPC code:

1. Extend $H_{init}$: H=LF ($H_{init}$, p)
2. Calculate initial performance of H:
   [SNRs,BERs]=OptStep(H,[$SNR_{min}$,$SNR_{max}$], [$BER_{min}$,$BER_{max}$],$Opt_{iter}$)
3. $H_{opt}$ =$H_{init}$
4. For i=1 to $Flips_{max}$:
   For j=1 to Iters
   i. $H_{cur}$ =$H_{opt}$
   ii. Randomly select i locations in the matrix $H_{cur}$
   iii. Flip values of the locations selected in $H_{cur}$ in step ii, and then update $H_{cur}$.
   iv. Lift $H_{cur}$: H=LF ($H_{cur}$, P)
   v. [$SNR_{cur}$, $BER_{cur}$]=OptStep(H, [$SNR_{min}$, $SNR_{max}$], [$BER_{min}$, $BER_{max}$], $Opt_{iter}$)

vi. If $(SNR_{cur}<SNRs)$ OR $((SNR_{cur}==SNRs)$ AND $(BER_{cur}<BERs))$, then:
  A. $SNR_{min}=SNR_{cur}$
  B. $BER_{min}=BER_{cur}$
  C. $H_{opt}^{proto}=H_{opt}$
  D. $H_{opt}^{full}=H$ It can be learned that the core idea of the optimization process of the ER-LDPC code is to find the minimum SNR required to reach the minimum BER within the given BER range. Once the BER is reached, the optimization algorithm further reduces the SNR and considers a smaller SNR range. In each optimization step, according to the algorithm, some locations in the current basis matrix H are randomly selected, and values of these locations are flipped. Then, the basis matrix is lifted to the full matrix by using the lifting function. If an SNR required by a new matrix when reaching the given BER is lower, the current matrix is updated, and an updated matrix is considered optimal. If even a maximum BER within the given BER range cannot be reached for the given SNR range, the algorithm increases the SNR, and then the optimization process is repeated.

The optimized basis matrix H_opt of the ER-LDPC code can be obtained according to the foregoing optimization algorithm.

Figure 10:
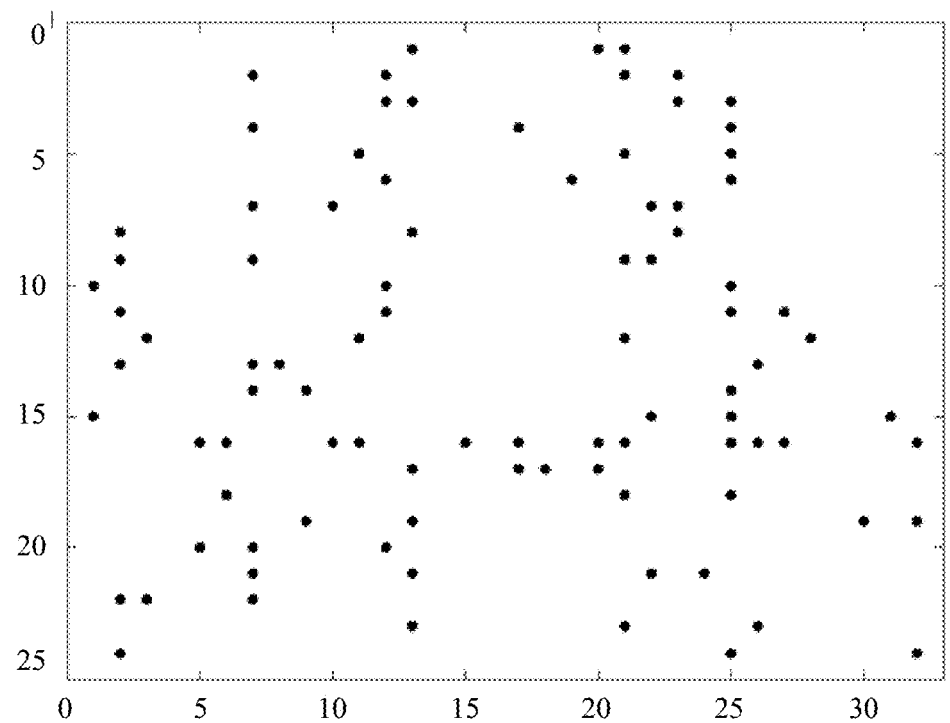
FIG. 10 is an example of an optimized basis matrix H_opt according to this application.

FIG. 10 is an example of an optimized basis matrix H_opt according to this application.

Figure 11:
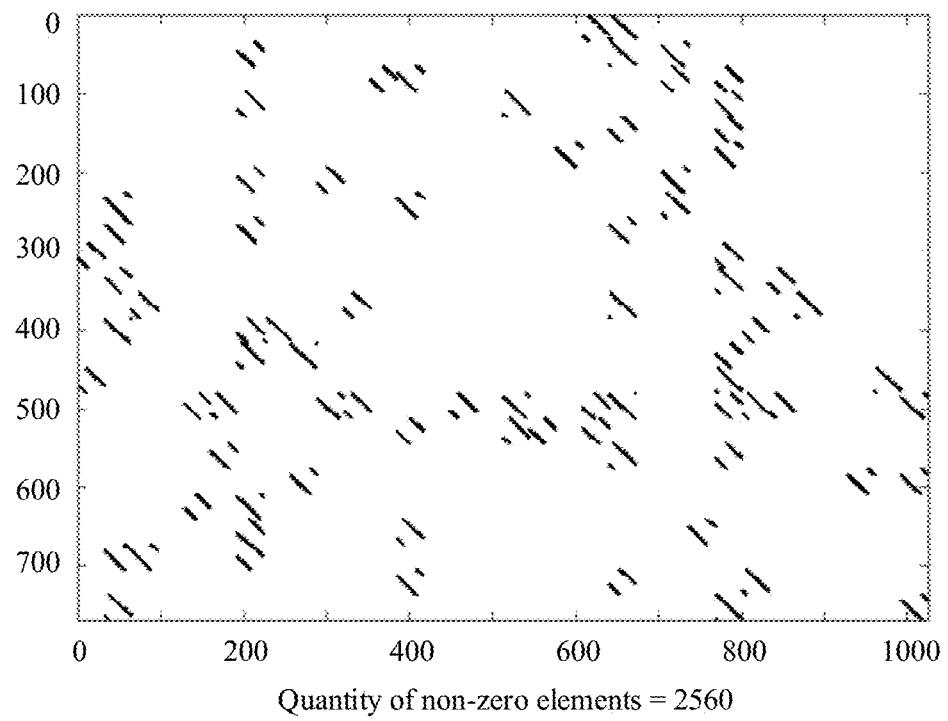
FIG. 11 is a matrix obtained after H_opt is lifted according to this application.

FIG. 11 is a matrix obtained after H_opt is lifted according to this application. It can be learned from FIG. 11 that the matrix obtained after lifting has all-zero columns, has no error correction capability, but has good BER performance.

Figure 12:
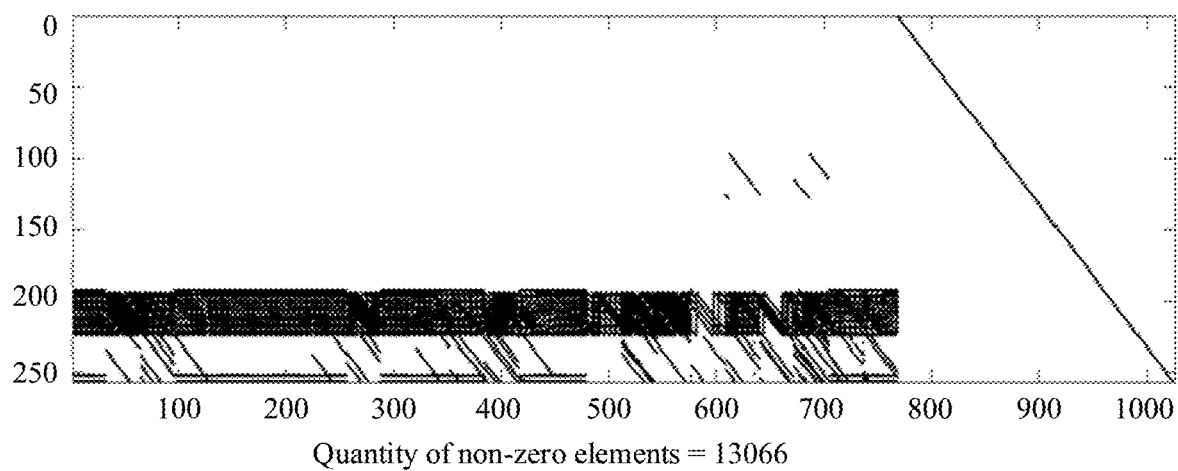
FIG. 12 is a generator matrix determined after H_opt is lifted according to this application.

FIG. 12 is a generator matrix determined after H_opt is lifted according to this application. It can be learned from FIG. 12 that the generator matrix has rows whose weights are 1, and the frozen set of the polar code needs to be mapped to these rows by using an outer interleaver. The generator matrix has no error correction capability, but has good BER performance.

Compared with the conventional LDPC code, the ER-LDPC code provided in this application has the following differences:

The check matrix has all-zero columns; and
the generator matrix of the ER-LDPC code is different from the LDGM matrix corresponding to the check matrix of the conventional LDPC code.

In addition, the optimized basis matrix H_opt has the following external characteristics:
  all-zero columns;
  a large proportion of columns with low column weights (for example, the column weight is 1 or 2);
  no error correction capability; and
  a difference between a column quantity N and a row quantity M being a power of 2.

For example, external characteristics of the basis matrix H at different concatenated code rates R are shown in Table 1.

TABLE 1

| Code rate of ER-LDPC code | Column weight of H | Column degree distribution | | | Sparsity |
|---|---|---|---|---|---|
| 1/4 | 0 1 2 3 | 0.1562 | 0.2812 | 0.2500 | 0.1042 |
|  | 4 5 6 8 | 0.1250 | 0.0312 | 0.0312 |  |
|  | 9 11 | 0.0312 | 0.0312 | 0.0312 |  |
|  |  | 0.0312 |  |  |  |
| 1/3 | 0 1 2 3 | 0.0833 | 0.2083 | 0.2083 | 0.1745 |
|  | 4 5 7 | 0.2083 | 0.0833 | 0.1250 |  |
|  |  | 0.0833 |  |  |  |

TABLE 1-continued

| Code rate of ER-LDPC code | Column weight of H | Column degree distribution | | | Sparsity |
|---|---|---|---|---|---|
| 2/3 | 0 1 3 4 | 0.3333 | 0.3125 | 0.1042 | 0.1016 |
|  |  | 0.2500 |  |  |  |
| 4/5 | 0 1 3 4 | 0.2000 | 0.1875 | 0.0625 | 0.2055 |
|  | 6 7 8 | 0.3500 | 0.0125 | 0.0625 |  |
|  |  | 0.1250 |  |  |  |

In the following, unless otherwise specified, the basis matrix of the ER-LDPC code is the optimized basis matrix H_opt.

(2) Construction of Lifting Matrix (Lifting Matrix).

Code length extension may be performed on the basis matrix of the ER-LDPC code by using a lifting method. The following describes the design of the lifting matrix.

Assuming that the basis matrix is a matrix with m rows and n columns, the basis matrix needs to be extended by a factor of p, to obtain a matrix whose dimension is equal to mp*np (m<n).

(1) Construct two vectors $C_{rows}$ and $C_{cols}$, where the row vector $C_{rows}=(r_1, r_2, \ldots, r_m)$, any two elements in $C_{rows}$ are not equal, that is, $r_i \neq r_j$, $r_i$ represents an $i^{th}$ element in the row vector $C_{rows}$, and $m \leq p$; and the column vector $C_{cols}=(c_1, c_2, \ldots, c_n)$, any two elements in the column vector $C_{cols}$ are not equal, that is, $c_i \neq c_j$, $c_j$ is a $j^{th}$ element in the column vector $C_{cols}$, and $n \leq p$.

(2) Construct an m*n lifting matrix M: $M(i,j)=r_i*c_j \mod p$, where mod is a modulo operation.

(3) Calculate a product of the basis matrix H_opt and the lifting matrix M at corresponding locations, to obtain a final basis matrix H_m=H_opt*M.

(4) Extend the basis matrix to a corresponding code length based on the basis matrix H_m and non-zero elements in the basis matrix.

In the solution provided in this application, a lifting matrix corresponding to a basis matrix whose dimension is m*n has the following external characteristics:

(1) The lifting matrix may be obtained by multiplying two vectors:

$$C_{rows} = (r_1, \ldots, r_m), \text{ where } r_i \neq r_j; \text{ and}$$

$$C_{cols} = (c_1, \ldots, c_n), \text{ where } c_i \neq c_j.$$

(2) Dimensions of the two vectors are respectively m and n, and it has to be satisfied that any two elements in the vector do not overlap. For example, two random sets (difference sets) whose dimensions are respectively 1*m and 1*n are selected.

(3) For any p>max (m, n), the lifting matrix $M(i,j)=(r_i*c_j) \mod p$ is constructed.

Figure 13:
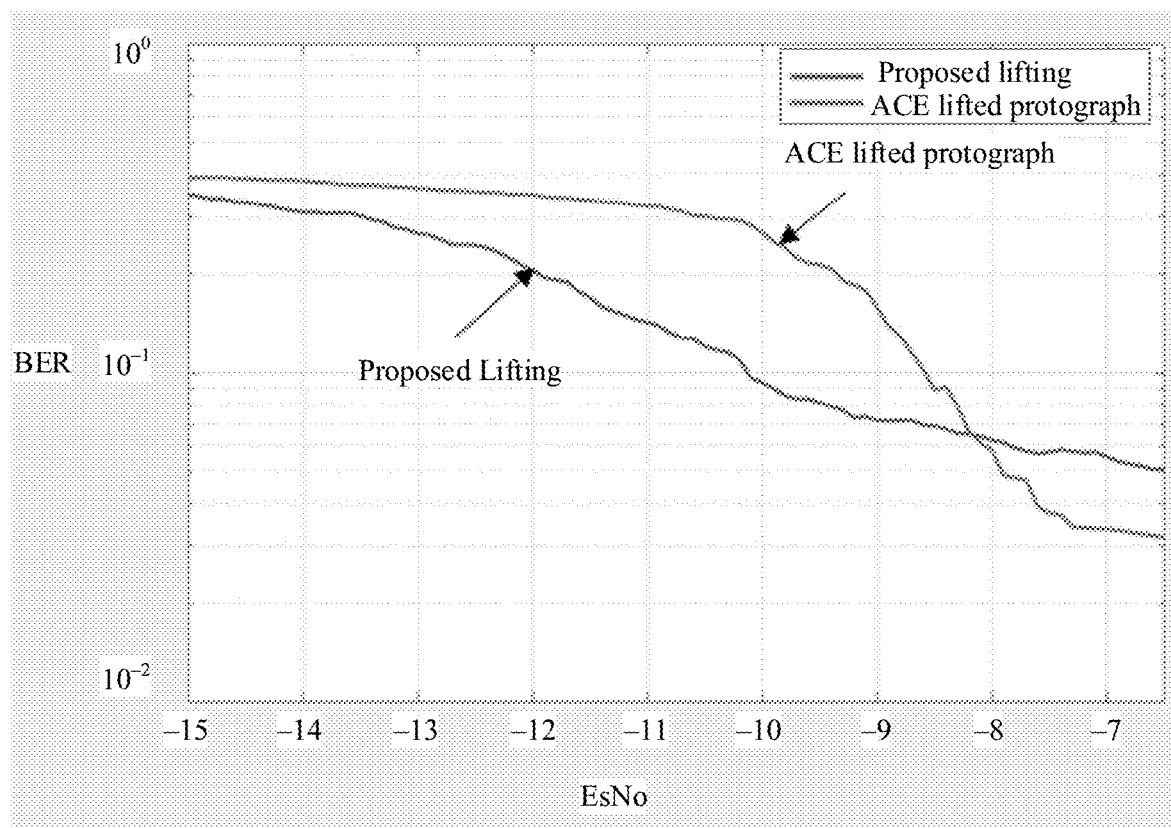
FIG. 13 is a schematic diagram of technical effect of a lifting matrix according to this application.

FIG. 13 is a schematic diagram of technical effect of a lifting matrix according to this application. In FIG. 13, simulation parameters are $N_i=1024$, $K_i=256$, and $R=1/4$, a dimension of the basis matrix of the ER-LDPC code is 24*32, and a lifting size (lifting size) is 32.

It can be found that, compared with an approximate cycle extrinsic (approximate cycle extrinsic, ACE) solution (for example, a BER curve marked by ACE lifted protograph), the lifting matrix of the solution in this application (proposed lifting) can enter a "waterfall region" of the BER curve more quickly. In addition, within an interval less than 0.1, the BER of the solution in this application is greater than the BER of the ACE solution, which means a larger dynamic range. It is to be noted that the ER-LDPC code in this application does not have an error correction capability, but more focuses on a "noise reduction" capability, that is, a lower SNR required when BER=0.1 is better.

3. Construction of Polar Outer Code.

A code length and a message bit quantity of the polar outer code are N_o and K_o respectively, where N_o=K_ldpc, and K_o=K+r. (that is, the actual message bit quantity plus r CRC check bits). The polar outer code needs to be further optimized based on the ER-LDPC inner code structure and the decoding process. The optimization process includes searching for frozen bits to ensure the overall decoding performance of the concatenated code.

The optimization process of the polar code is as follows:
(1) Select a target SNR.
(2) Construct an initial polar code P_start at the SNR through density evolution (density evolution, DE).
(3) Generate a random interleaver $P_i$ whose length is the code length.
(4) Collect a statistical value of an LLR of a current channel at a given SNR, that is, the LLR corresponding to a channel receive vector.
(5) Calculate BLER performance FER_init=FER (dec_conc, LLR (y), P_start) of the current concatenated code, where dec_conc is the decoder of the concatenated code shown in FIG. 9.
(6) FER_opt=FER_init.
(7) P_opt=P_init.
(8) While i<maxIter:
(a) i=i+1;
(b) randomly select a location in a message set of P_opt;
(c) randomly select a location in a frozen set of P_opt;
(d) exchange the locations in step (b) and step (c), and update the message set and the frozen set;
(e) calculate the performance FER_new=FER (dec_conc, LLR (y), P_start, $P_i$) of the concatenated code; and
(f) if FER_new<FER_opt:
i. FER_opt=FER_new; and
ii. P_opt=P_new.

The optimized polar outer code can be obtained by using the foregoing search algorithm.

4. Design of Interleaver of Concatenated Code.

An interleaver exists between the outer code and the inner code in the technical solution of this application. The following describes the design of the interleaver.

(1) The frozen bit set of the polar outer code is denoted as a set F={$f_1, f_2, \ldots, f_R$}, and the set F is sorted in a natural order, where $f_1$ has a minimum value, and $f_R$ has a maximum value.

(2) Row mark numbers (or row indexes) of the generator matrix of the ER-LDPC inner code are denoted as a set S={$j_1, j_2, \ldots, j_{No}$}, and the row mark numbers in the set S are sorted in ascending order of row weight.

(3) The interleaver maps R frozen locations in the frozen bit set F of the polar code to R rows corresponding to first R row mark numbers of the set S, that is, F→S [1: R]; and maps the remaining ($N_o$-R) message locations to rows corresponding to the remaining row mark numbers in the set S, that is, [K]/F=I→S[R+1:$N_o$].

In this specification, the interleaver that respectively maps the frozen bits and the message bits to the first R locations and the remaining locations in the set S is referred to as an outer interleaver, and the interleaving for the sets S[1:R] and S[R+1:$N_o$] is referred to as an inner interleaver. The outer interleaving is configured to complete the outer interleaving, and the inner interleaver is configured to complete the inner interleaving.

Optionally, any random interleaver may be used as an inner interleaver, but an outer interleaver needs to meet a restriction of mapping frozen bits to R locations with lowest row weights.

(4) The outer interleaver and the inner interleaver are concatenated to obtain a final interleaver $I_{total}=I_{outer}(I_{inner})$ between the polar outer code and the ER-LDPC inner code of the concatenated code.

General Descriptions of Interleavers:
Outer Interleaver:
frozen bit set F→S[1:R]
message bit set [1:$N_o$]/F=I→S [R+1,$N_o$]
Optionally, the inner interleaving may be as follows:
(a) random interleaving;
(b) quadratic interleaving j→(a*j*(j−1)/2 mod $N_o$)+1, where $N_o$ is an interleaver length, a is any odd number, j=1, 2, 3, . . . , $N_o$, for example, a=3 and $N_o$=8, and the quadratic interleaving is performed on the sequence [1 2 3 4 5 6 7 8] to obtain the sequence [1 4 2 3 7 6 8 5]; and
(c) cyclic interleaving j→(b*j+r) mod $N_o$+1, where b is an integer that is mutually prime with $N_o$, $N_o$ is an interleaver length, r is any integer, for example, r=6 and b=7, and the cyclic interleaving is performed on the sequence [1 2 3 4 5 6 7 8] to obtain the sequence [6 5 4 3 218 7].

The foregoing describes in detail the concatenated code encoding solution and the concatenated code decoding solution that are provided in this application, and various aspects related to encoding and decoding (such as construction and optimization of the ER-LDPC code, construction and optimization of the polar outer code, and design of the interleaver). The following provides several examples of the technical solutions of this application.

Example 1 (Example of Interleaver of Concatenated Code)

(1) Determine a corresponding generator matrix G based on the basis matrix H_opt of the ER-LDPC code.
(2) Sort row mark numbers of the generator matrix G in ascending order of row weight, to obtain a set S.
(3) Map the R frozen bits of the polar code to locations corresponding to first R row mark numbers of the set S, and then perform inner interleaving on a sequence S[1:R], where the inner interleaving may be random interleaving, quadratic interleaving, cyclic interleaving, or the like.

For example, F={$f_1, f_2, \ldots, f_R$} is a frozen bit set of the polar outer code; and S={$j_1, j_2, \ldots, j_K$} is a set of row mark numbers with row weights of 1 in the generator matrix of the ER-LDPC code.

Enable $f_i$→i and $j_s$→j.

If a quantity of rows whose row weights are 1 in the generator matrix G is less than a dimension of the frozen bit set F, that is, R>K, K elements {$f_1, f_2, \ldots, f_K$} are randomly selected from the set F, these elements are mapped to the set S, and then an inner interleaver is used for the set S. The ($N_o$-R) message bits and the remaining (R-K) frozen bits are mapped to the sequence S [R+(K-R)+1:$N_o$], and then the inner interleaver is used for the sequence.

If a quantity of rows whose row weights are 1 in the generator matrix G is greater than or equal to a dimension of the frozen bit set F, that is, R≤K, first R row mark numbers in the set S are selected as a set $S_K$=S[1:R], the set F={$f_1, f_2, \ldots, f_R$} is mapped to the set $S_K$, and then an inner interleaver is used for the set $S_K$. The ($N_o$-R) message bits are mapped to the set S [R+1:$N_o$], and then the inner interleaver is used for the set.

Figure 14:
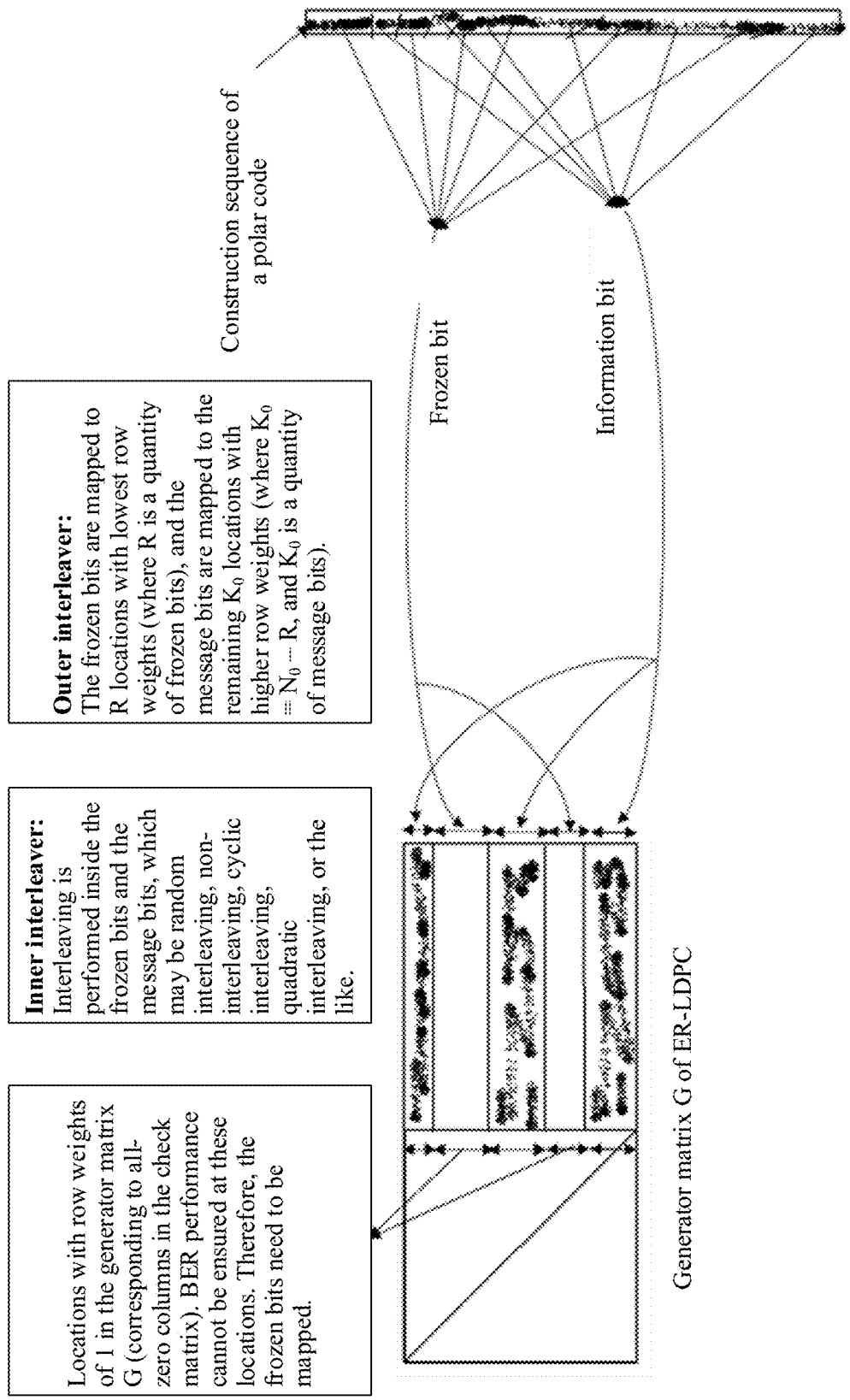
FIG. 14 is a schematic diagram of an inner interleaver and an outer interleaver according to this application.

FIG. 14 is a schematic diagram of an inner interleaver and an outer interleaver according to this application. As shown in FIG. 14, in this application, considering that locations with row weights of 1 in the generator matrix G of the ER-LDPC code correspond to all-zero columns in the check matrix, BER performance cannot be ensured at these locations. Therefore, the frozen bits of the polar outer code are mapped to rows with low row weights (for example, the row weight is 1 or 2) of the generator matrix, for example, R rows with lowest row weights.

Inner interleaver: Interleaving may be performed inside the frozen bits and the message bits, which may be random interleaving, non-interleaving, cyclic interleaving, quadratic interleaving, or the like.

Outer interleaver: The frozen bits are mapped to R locations with lowest row weights, and the message bits are mapped to the remaining $K_o$ locations with higher row weights.

In addition, in this application, a method for finding a row whose row weight is 1 in the generator matrix G is as follows:

The basis matrix H_opt obtained through optimization search is given. Because there is a one-to-one correspondence between the generator matrix G and the check matrix, a form of the generator matrix of the basis matrix can be obtained, so that a set S={$i_1$, $i_2$, ..., $i_s$} of row mark numbers with row weights of 1 in the basis matrix is obtained. A lifting size p (lifting size p) is given, so that a row mark number with a weight of 1 after the matrix is lifted p times can be obtained by the following formula:

$$\{p*(i_1-1)+1: p*i_1, p*(i_2-1): p*i_2, \ldots, p*(i_S-1): p*i_S\}$$

Figure 15:
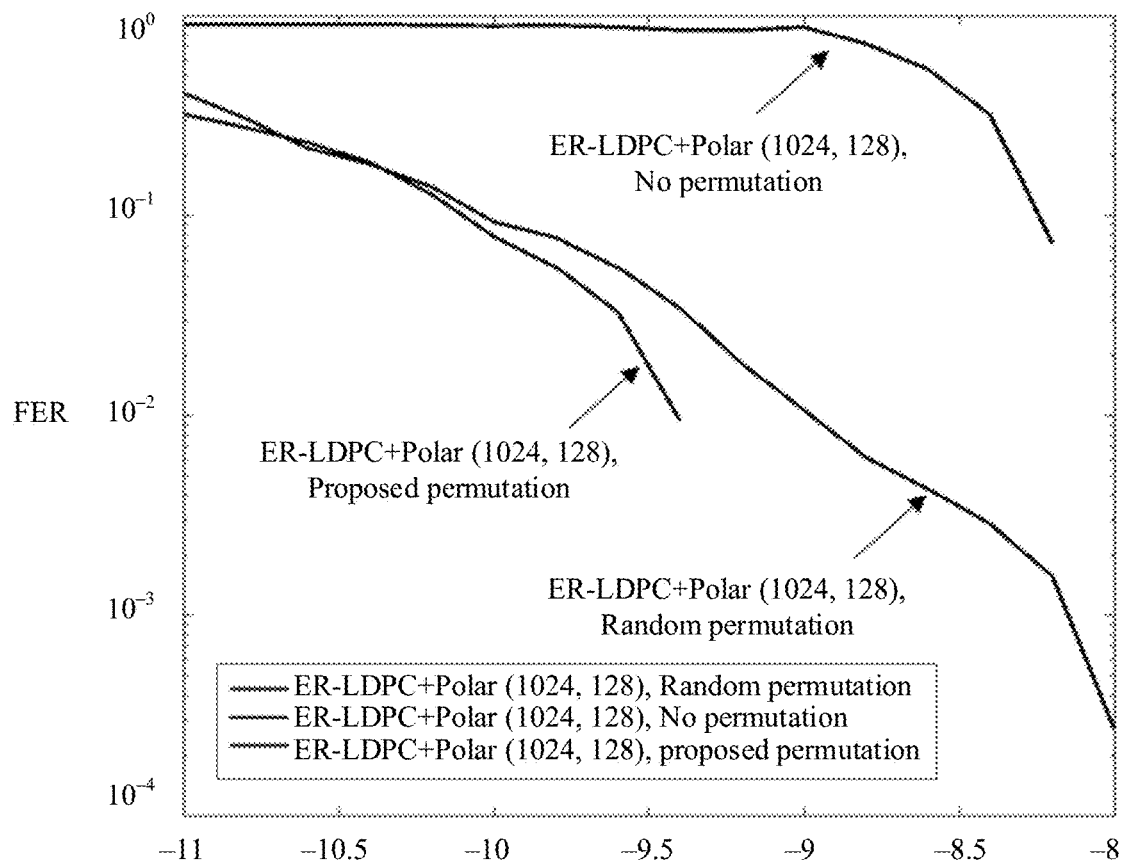
FIG. 15 shows a performance comparison between a random interleaver, no interleaver, and an interleaver provided in this application.

FIG. 15 shows a performance comparison between no interleaver, a random interleaver, and an interleaver provided in this application. FIG. 15 shows decoding performance obtained by using a random interleaver (for example, the FER curve marked by ER-LDPC+polar random permutation), decoding performance obtained by using no interleaver (for example, the FER curve marked by ER-LDPC+polar no permutation), and decoding performance obtained by using an interleaver provided in this application (for example, the FER curve marked by ER-LDPC+polar proposed permutation) when a basis matrix of the ER-LDPC code whose dimension is 24*32 is used at $N_o$=256, $K_o$=128, $K_i$=256, $N_i$=1024, and R=1/8, and the polar code is constructed through density evolution under Gaussian approximation and is optimized by using an optimization algorithm provided in this application. The horizontal axis indicates a signal-to-noise ratio, which is represented by $E_S N_o$. The vertical axis indicates a block error rate, which is represented by FER. It can be learned from FIG. 15 that the interleaver provided in this application can improve decoding performance of the concatenated code.

The interleaving of the concatenated code provided in this application is not block-wise interleaving (block-wise interleaving), and is related to the message bit set of the polar code, and is also related to the row weight of the check matrix of the ER-LDPC code.

Example 2 (Example of Interleaver)

A ($N_i$=512, $K_i$=128) ER-LDPC inner code is concatenated to a ($N_o$=128, $K_o$=64) polar outer code to obtain a concatenated code. For the overall concatenated code, a length is 512 and a message bit quantity is 64.

First, a generator matrix G of the ER-LDPC code is obtained based on a basis matrix of the ER-LDPC code, and then mark numbers S={1:48, 53, 54, 65:94} with row weights of 1 are found in the generator matrix G, where a size of S is K=80.

Then, the polar code (namely, a first polar code) is obtained through optimization, and a frozen bit set F={1:30, 33:43, 45, 49:51, 53, 57, 65:71, 73:75, 77, 81:83, 97} of the optimized polar code, where a size of F is R=62.

In this example, F<K. Therefore, 62 frozen locations may be mapped to any 62 locations in the set S: 62 row mark numbers are randomly selected from 80 row mark numbers in the set S, and then are in a one-to-one correspondence with the set F. For example, the first 62 row mark numbers {1:48, 53, 54, 65:76} are selected from the set S, and then an outer interleaver is 1→1, 2→2, ..., 97→76.

The remaining message bits in the message bit set of the polar code may be mapped to row mark numbers that are in the generator matrix G and to which no message bit is mapped. For example, the remaining 64 message locations [1 ... 128]/F={31, 32, 44, 46, ... } of the polar code may be mapped to 31→49, 32→50, 44→51, ..., 128→128.

Example 3

The following describes a concatenated code encoding procedure and a concatenated code decoding procedure provided in this application by using a concatenated code whose code rate is R=1/8 (code length N=1024, K=128) as an example. In this example, an inner code of the concatenated code is an ER-LDPC code ($N_i$=1024, $K_i$=$N_o$=256), and an outer code is a polar code ($N_o$=256, $K_i$=K=128+2 (2 CRC check bits)). A polynomial of CRC-2 is g (x)=$x^2$+x+1.

Figure 16:
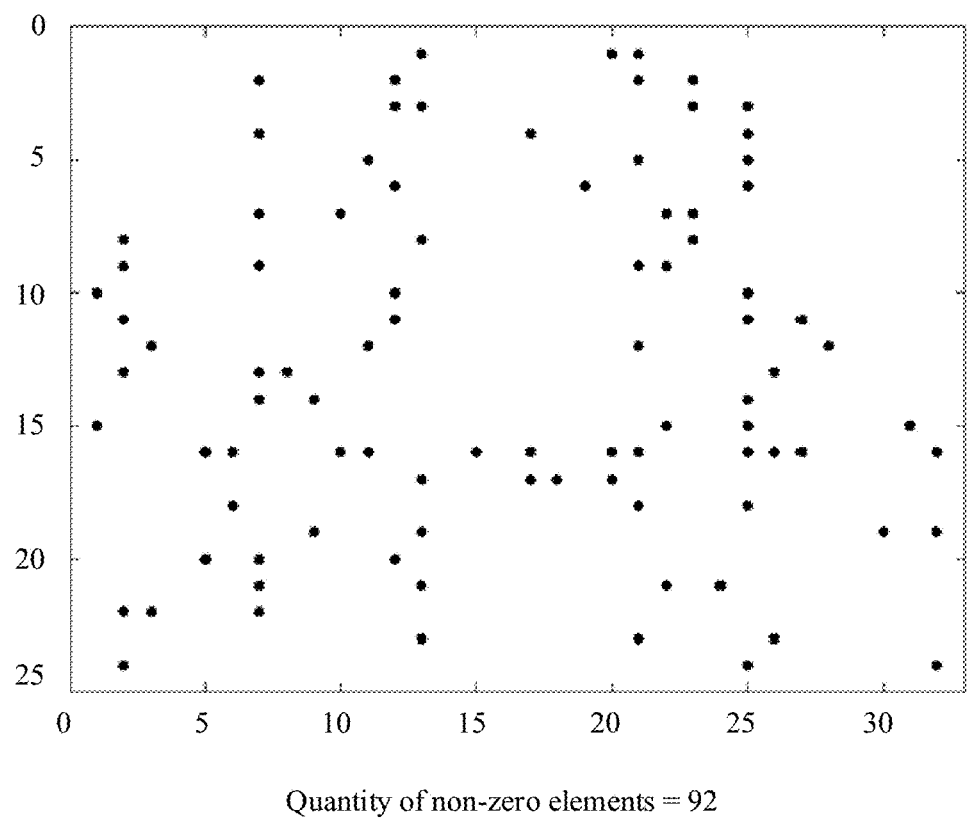
FIG. 16 is an example of a basis matrix of an ER-LDPC code according to this application.

(1) A basis matrix of the ER-LDPC code is first constructed. An optimized basis matrix whose size is 24*32 is obtained according to the optimization procedure provided in this application, as shown in FIG. 16. FIG. 16 is an example of the basis matrix of the ER-LDPC code according to this application.

Figures 17, 18:
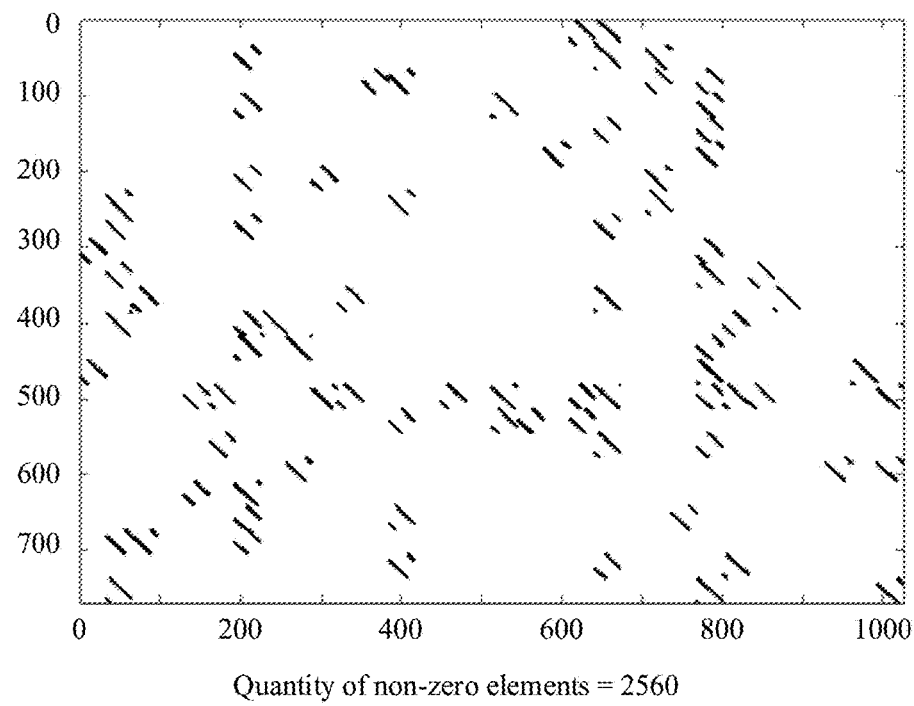
FIG. 17 is an example of a lifting matrix of an ER-LDPC code according to this application.
FIG. 18 is a final check matrix of an ER-LDPC code in a binary field with a dimension of 768*31024.

(2) A lifting matrix whose size is 24*32 is designed according to the method for constructing a lifting matrix provided in this application. The obtained lifting matrix is shown in FIG. 17. FIG. 17 is an example of the lifting matrix of the ER-LDPC code according to this application.

(3) A non-zero element in the lifting matrix obtained in step (2) is replaced with a 32*32 unit matrix, and then the unit matrix is translated rightward by a quantity of columns corresponding to a value of the non-zero element, to obtain a final check matrix of the ER-LDPC code in a binary field, as shown in FIG. 18. FIG. 18 is a final check matrix of the ER-LDPC code in the binary field with a dimension of 768*1024.

Figure 19:
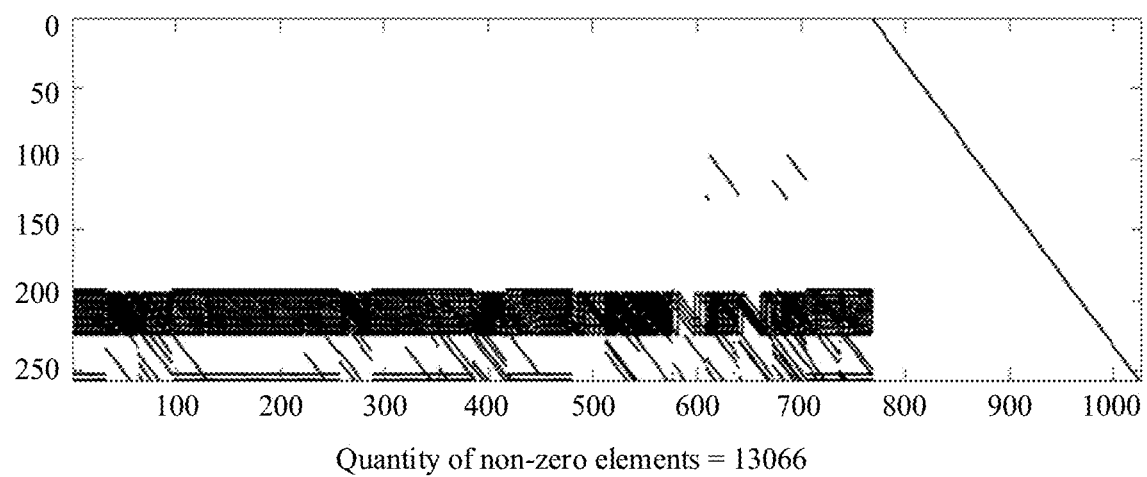
FIG. 19 is an example of a generator matrix obtained through conversion based on a check matrix.

Certainly, the final check matrix of the ER-LDPC code in the binary field may also be converted into a form of a generator matrix, as shown in FIG. 19. FIG. 19 is an example of the generator matrix obtained based on conversion of the check matrix.

(4) An interleaver sequence W whose length is $N_o=256$ is generated according to the method for designing an interleaver provided in this application.

$W$ = (26 7 234 48 210 74 120 220 195 180 129 29 126 75 24

31 81 107 80 1 117 99 60 63 97 27 249 70 30 10 135 78 237

71 69 122 205 175 194 218 125 242 124 202 37 102 176 68

3 53 146 201 148 191 21 154 132 19 142 256 233 193 95 47 35 229

118 93 228 173 211 22 50 66 246 58 38 33 55 227 51 223 43 186

212 213 34 4 250 145 139 32 168 203 54 83 40 101 5 84 215

226 144 177 119 133 23 73 131 183 235 136 150 110 163 44

112 254 251 247 143 17 11 67 224 208 241 164 219 209 79 109

62 171 91 2 182 116 174 187 155 232 92 147 49 190 59 87

167 149 121 255 141 207 103 199 199 184 134 61 200 230

115 39 76 105 192 243 12 111 52 42 198 196 239 3 158 178

106 240 137 57 166 162 72 25 238 15 13 236 114 244 100

170 14 185 96 20 140 77 18 245 88 206 151 89 98 127 165

85 172 197 161 104 64 128 153 108 222 169 56 253 123

216 160 221 179 152 188 225 130 217 9 41 159 82 156 36

252 248 94 28 90 157 86 45 204 6 138 231 65 181 16 8 189)

(5) Construction of polar code (outer code) sequence: In this embodiment, the polar code has a code length of $N_o=256$ and $K_o=128$, where $K_o$ does not include a 2-bit CRC check bit. Therefore, the actual length of the message bit set is 128+2 (that is, two CRC check bits)=130. The polar code sequence is constructed by using the method for constructing a polar code provided in this application, to obtain a final message bit set I.

$I$ = {56 60 62 63 64 80 88 92 93 94

95 96 104 106 107 108 109 110 111 112 114 115

116 117 118 119 120 121 122 123 124 125

126 127 128 144 151 152 154 155 156 157 158 159

160 164 166 167 168 170 171 172 173 174

175 176 178 179 180 181 182 183 184 185 186 187

188 189 190 191 192 196 198 199 200 202

203 204 205 206 207 208 209 210 211 212 213 214

215 216 217 218 219 220 221 222 223 224

225 226 227 228 229 230 231 232 233 234 235 236

237 238 239 240 241 242 243 244 245 246 247 248 249 250 251}

The lifting matrix provided in this application has beneficial technical effects.

By designing the interleaver and the ER-LDPC matrix, and jointly optimizing the polar outer code, decoding performance obtained according to the solution provided in this application is better than performance of an existing polar code.

Figure 20:
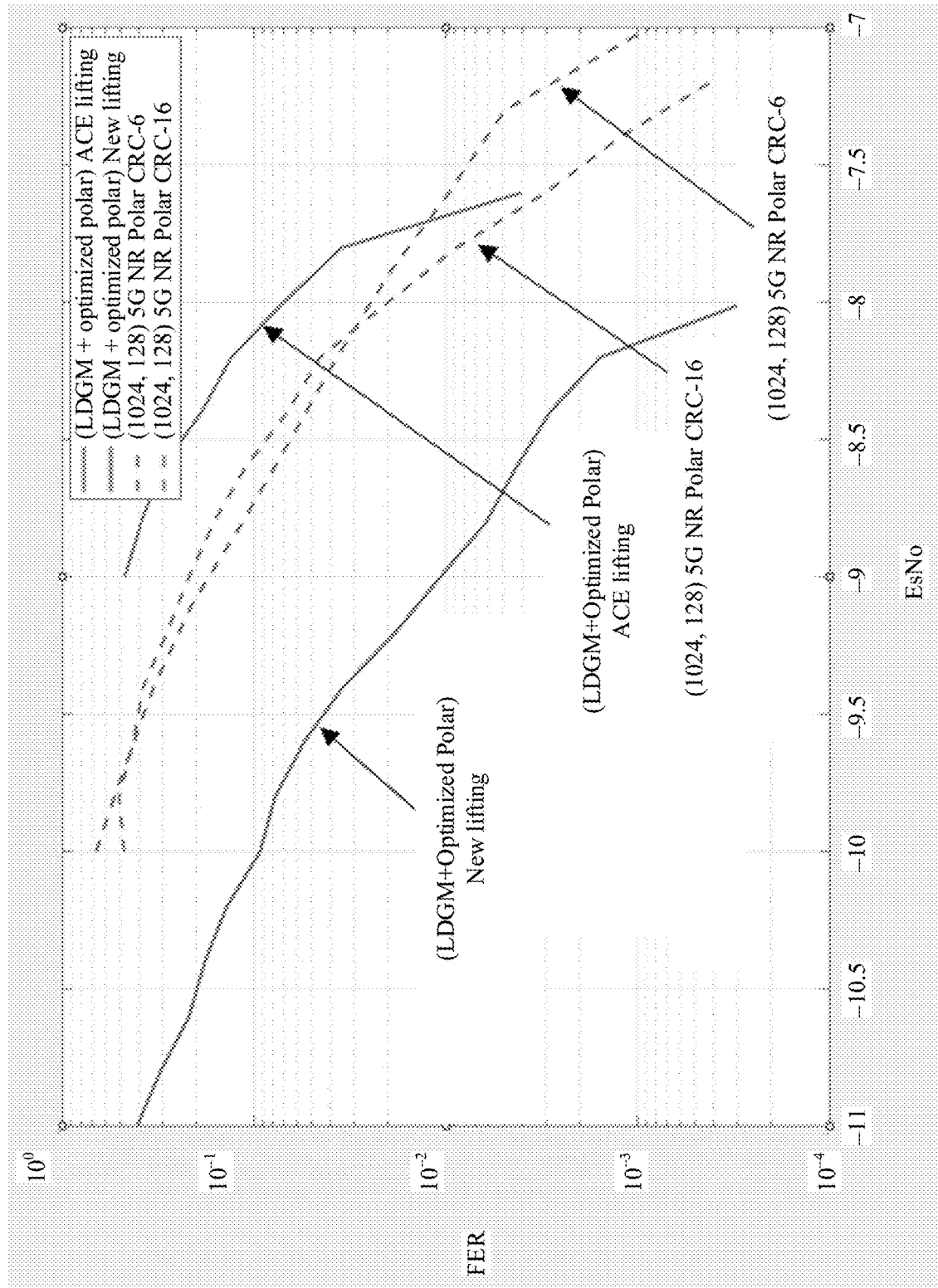
FIG. 20 shows a performance comparison between a solution provided in this application and an existing polar code when N=1024 and K=128 (excluding r CRC bits)

FIG. 20 shows a performance comparison between a solution provided in this application and an existing polar code when N=1024 and K=128 (excluding r CRC bits). It can be found from FIG. 20 that performance obtained by using a lifting (lifting) method in the solution provided in this application (for example, the FER curve marked by new lifting) is better than performance obtained by using a lifting method of existing ACE design (for example, the FER curve marked by ACE lifting), and is also better than performance obtained by using an existing polar code solution with a same code length and code rate (for example, 5G NR polar CRC-6 using a 6-bit CRC check, or 5G NR polar CRC-16 using a 16-bit CRC check). The solution provided in this application uses a 2-bit CRC check.

Panel (a) and panel (b) in FIG. 21 show a comparison of decoding performance between an interleaver provided in this application and no interleaver. It can be found that decoding performance can be greatly improved by using the interleaver provided in this application.

Specifically, panel (a) in FIG. 21 is a BER curve when N=4096 and a code rate R=0.5 that is provided in a prior literature. The website link to this literature is as follows:
https://ses.library.usyd.edu.au/bitstream/handle/2123/14619/Duo_b_thesis.pdf?sequen ce=2&isAllowed=y.

Panel (b) in FIG. 21 shows BER performance of the solution provided in this application (for example, the curve marked by ER-LDPC+polar BER, with a code length of N=4096 and a code rate of R=0.5, where a code rate of the polar outer code is $R_o=3/4$, and a code rate of the ER-LDPC inner code is $R_i=2/3$). It can be found that, when BER=0.001, the BER performance of the solution provided in this application has a gain of about 0.15 dB compared with the BER performance of the existing polar+LDGM solution.

In addition, it can be found that, when BLER=0.01, the solution of panel (b) in FIG. 21 has a gain of about 0.4 dB compared with the existing polar code (4096, 2048) constructed based on DE and using CRC-16+SCL-32 for decoding (for example, the curve marked by DE polar, SCL-32, CRC-16 FER).

FIG. 22 shows a performance comparison between a concatenated code solution provided in this application and an existing concatenated code solution. The solution in this application provides the performance (for example, the FER curve marked by proposed) when N=4096 and K=3072, where the polar outer code has a code rate of 15/16, the ER-LDPC inner code has a code rate of R=8/10, and an overall concatenated code rate is 3/4. The other curve indicates the existing polar code technical solution (for example, the FER curve marked by DE-polar SCL-32, CRC-16), which is constructed based on DE when EbNo=5 dB, and uses CRC-16+SCL-32 for decoding. It can be found that, in soft information iterative decoding, the technical solution in this application has better decoding performance than the existing polar code.

FIG. 23 to FIG. 26 show performance comparisons between a concatenated code solution provided in this application and an existing concatenated code solution at other code lengths and code rates, to reflect performance advantages of the technical solution provided in this application at the other code lengths and code rates. It can be found that the solution provided in this application can flexibly adapt to different code lengths and code rates, and has performance better than a polar encoding solution under an existing DE construction.

The foregoing describes the concatenated code encoding method and the concatenated code decoding method that are provided in this application. The following describes a communication apparatus provided in this application.

FIG. 27 is a schematic block diagram of a communication apparatus according to this application. As shown in FIG. 27, a communication apparatus 1000 includes a processing unit 1100, a receiving unit 1200, and a sending unit 1300.

Optionally, the communication apparatus 1000 may correspond to the transmit end in the method embodiments of this application. In this case, the units of the communication apparatus 1000 are configured to implement the following functions:

The receiving unit 1200 is configured to obtain a to-be-encoded message bit sequence.

The processing unit 1100 is configured to:

perform polar code encoding on the to-be-encoded message bit sequence based on a frozen bit set and a message bit set that are of a first polar code, to obtain a first encoded code word whose length is N_o;

interleave the first encoded code word to obtain a second encoded code word; and perform optimized low-density parity-check LDPC code encoding on the second encoded code word to obtain a concatenated code word, where the interleaving includes outer interleaving and inner interleaving, where the outer interleaving includes: mapping R frozen bits in the frozen bit set of the first polar code to R rows of a generator matrix of the optimized LDPC code, where row weights of the R rows are lower than or equal to row weights of rows of the generator matrix other than the R rows, and mapping (N_o-R) message bits in the message bit set of the first polar code to remaining (N_o-R) rows of the generator matrix of the optimized LDPC code other than the R rows; and the inner interleaving includes: interleaving on the R frozen bits in the frozen bit set of the first polar code and interleaving on the (N_o-R) message bits in the message bit set of the first polar code.

The sending unit 1300 is configured to output the concatenated code word.

Optionally, in an embodiment, the processing unit 1100 is further configured to:

randomly generate a basis matrix of an LDPC code;

optimize the basis matrix to obtain an optimized basis matrix, where the optimized basis matrix is capable of reaching a minimum bit error rate BER within a given BER range, and a signal-to-noise ratio SNR required at the minimum BER is minimum;

generate a lifting matrix; and obtain a basis matrix of the optimized LDPC code based on the optimized basis matrix and the lifting matrix, where the generator matrix of the optimized LDPC code is determined based on the basis matrix of the optimized LDPC code.

Optionally, in an embodiment, a size of the basis matrix is m rows and n columns, and the processing unit 1100 is configured to:

construct a row vector whose size is m and a column vector whose size is n, where any two elements in the row vector are different, any two elements in the column vector are different, both m and n are less than or equal to p, p is a factor by which the basis matrix of the optimized LDPC code needs to be extended, and m, n, and p are all integers; and obtain the lifting matrix based on the row vector and the column vector.

Optionally, in an embodiment, the processing unit is configured to:

construct the lifting matrix $M(i,j)=r_i \cdot c_j \bmod p$, where in the row vector $C_{rows}=(r_1, r_2, \ldots, r_m)$, $r_i$ is an $i^{th}$ element in the row vector $C_{rows}$, $r_i \neq r_j$, in the column vector $C_{cols}=(c_1, c_2, \ldots, c_n)$, $c_j$ is a $j^{th}$ element in the column vector $C_{cols}$, $c_i \neq c_j$, and mod is a modulo operation.

Optionally, in an embodiment, the processing unit 1100 is configured to:

construct an initial polar code at a target signal-to-noise ratio SNR; and perform iterative optimization on the initial polar code a specified quantity of times based on the optimized LDPC code and the initial polar code, to obtain the first polar code, where an intermediate polar code is obtained each time the iterative optimization is performed, and if frame error rate FER performance of the concatenated code with an intermediate polar code obtained through $j^{th}$ iterative optimization as an outer code and with the optimized LDPC code as an inner code is better than FER performance of the concatenated code with an intermediate polar code obtained through $(j-1)^{th}$ iterative optimization as an outer code and with the optimized LDPC code as an inner code, the outer code of the concatenated code is updated to the intermediate polar code obtained through the $j^{th}$ iterative optimization; and the initial polar code is an initially determined outer code of the concatenated code, and the first polar code is a finally determined outer code of the concatenated code through the iterative optimization the specified quantity of times, where j>1, j is less than or equal to the specified quantity of times, and j is an integer.

Optionally, the communication apparatus 1000 may correspond to the receive end in the method embodiments of this application. In this case, the units of the communication apparatus 1000 are configured to implement the following functions:

The receiving unit 1200 is configured to obtain a channel receive vector whose length is $N_i$, where $N_i$ is a length of an inner code of a concatenated code, the inner code of the concatenated code is an optimized LDPC code, an outer code of the concatenated code is a polar code, and $N_i$ is a positive integer.

The processing unit 1100 is configured to:

decode the channel receive vector by using a soft input soft output SISO decoding algorithm of the optimized LDPC code, to obtain a first soft information sequence whose length is $N_i$;

de-interleave the first soft information sequence to obtain a de-interleaved first soft information sequence, and extract soft information at first N_o locations in the de-interleaved first soft information sequence to obtain a second soft information sequence, where N_o is a length of the outer code of the concatenated code, and N_o is a positive integer;

perform soft information iterative decoding by using a soft SCL decoding algorithm of the polar code and the SISO decoding algorithm of the optimized LDPC code based on the second soft information sequence, the channel receive vector, and a preset maximum iteration quantity of times of the concatenated code, to obtain a third soft information sequence; and perform a hard decision on the third soft information sequence to obtain a candidate sequence.

The sending unit 1300 is configured to output the candidate sequence.

Optionally, in an embodiment, the processing unit 1100 is configured to:

perform soft information iterative decoding (j−1) times to obtain a (j−1)$^{th}$ soft information sequence outputted by the soft SCL decoding algorithm;

subtract a soft information sequence inputted by the soft SCL decoding algorithm in a (j−1)$^{th}$ soft information iterative decoding process from the (j−1)$^{th}$ soft information sequence, to obtain a j$^{th}$ piece of extrinsic information of the SISO decoding algorithm;

use the j$^{th}$ piece of extrinsic information and the channel receive vector as an input into the SISO decoding algorithm in a j$^{th}$ soft information iterative decoding process, to obtain an output of the SISO decoding algorithm in the j$^{th}$ soft information iteration process; and use the output of the SISO decoding algorithm in the j$^{th}$ soft information iteration process as prior information of the soft SCL decoding algorithm in the j$^{th}$ soft information iterative decoding process, to obtain a j$^{th}$ soft information sequence of the soft SCL decoding algorithm, where the j$^{th}$ soft information sequence of the soft SCL decoding algorithm is a soft information sequence outputted by the soft SCL decoding algorithm in the j$^{th}$ soft information iteration process;

the j$^{th}$ piece of extrinsic information of the SISO decoding algorithm is extrinsic information inputted to the SISO decoding algorithm in the j$^{th}$ soft information iteration process;

the second soft information sequence is a soft information sequence inputted to the soft SCL decoding algorithm in a first soft information iteration process, and the third soft information sequence is a soft information sequence outputted by the soft SCL decoding algorithm in a last soft information iteration process; and 1<j≤max_Iter, and j is a positive integer.

Optionally, in an embodiment, an input into the soft SCL decoding algorithm includes a list size and a soft information sequence; and an output of the soft SCL decoding algorithm includes a soft information sequence of an encoder-side code word of the polar code and a soft information sequence of a decoder-side code word of the polar code, where a soft information sequence for determining extrinsic information of the SISO decoding algorithm is the soft information sequence of the decoder-side code word of the polar code.

In the foregoing implementations, the receiving unit 1200 and the sending unit 1300 may alternatively be integrated into a transceiver unit with both a receiving function and a sending function. This is not limited herein.

In the embodiments in which the communication apparatus 1000 corresponds to the transmit end, the processing unit 1100 is configured to perform processing and/or operations implemented internally by the transmit end instead of sending and receiving actions. The receiving unit 1200 is configured to perform a receiving (or input) action of the transmit end. The sending unit 1300 is configured to perform a sending (or output) action of the transmit end.

For example, in FIG. 5, the processing unit 1000 is configured to perform step 210, and the sending unit 1300 is configured to perform step 220.

In another example, in FIG. 7, the receiving unit 1200 is configured to perform step 310, the processing unit 1100 is configured to perform step 320 to step 350, and the sending unit 1300 is configured to perform step 350.

In the embodiments in which the communication apparatus 1000 corresponds to the receive end, the processing unit 1100 is configured to perform processing and/or operations implemented internally by the receive end instead of sending and receiving actions. The receiving unit 1200 is configured to perform a receiving (or input) action of the receive end. The sending unit 1300 is configured to perform a sending (or output) action of the receive end.

For example, in FIG. 5, the processing unit 1100 is configured to perform step 230.

In another example, in FIG. 8, the receiving unit 1200 is configured to perform step 510, the processing unit 1100 is configured to perform step 520 to step 550, and the sending unit 1300 is configured to perform step 560.

FIG. 28 is a schematic diagram of a structure of a communication apparatus according to this application. As shown in FIG. 28, a communication apparatus 10 includes one or more processors 11, one or more memories 12, and one or more communication interfaces 13. The processor 11 is configured to control the communication interface 13 to receive and send a signal. The memory 12 is configured to store a computer program. The processor 11 is configured to call the computer program from the memory 12 and run the computer program, so that the communication apparatus 10 performs processing performed by the transmit end or the receive end in the method embodiments of this application.

For example, the processor 11 may have a function of the processing unit 1100 shown in FIG. 27, and the communication interface 13 may have a function of the receiving unit 1200 and/or the sending unit 1300 shown in FIG. 27. Specifically, the processor 11 may be configured to perform processing or operations performed internally by the communication apparatus, and the communication interface 13 is configured to perform a sending and/or receiving operation of the communication apparatus.

In FIG. 28, a dashed box behind a component (such as the processor, the memory, or the communication interface) indicates that there may be one or more components.

Optionally, the memory and the processor in the foregoing apparatus embodiments may be physically independent units, or the memory and the processor may be integrated together. This is not limited in this specification.

In addition, this application further provides a computer-readable storage medium. The computer-readable storage medium stores computer instructions. When the computer instructions are run on a computer, operations and/or processing performed by the transmit end in the method embodiments of this application are/is performed.

This application further provides a computer-readable storage medium. The computer-readable storage medium stores computer instructions. When the computer instructions are run on a computer, operations and/or processing performed by the receive end in the method embodiments of this application are/is performed.

In addition, this application further provides a computer program product. The computer program product includes computer program code or instructions. When the computer program code or the instructions are run on a computer, operations and/or processing performed by the transmit end in the method embodiments of this application are/is performed.

This application further provides a computer program product. The computer program product includes computer program code or instructions. When the computer program code or the instructions are run on a computer, operations and/or processing performed by the receive end in the method embodiments of this application are/is performed.

In addition, this application further provides a chip. The chip includes a processor. A memory configured to store a computer program is disposed independent of the chip. The processor is configured to execute the computer program stored in the memory, to enable an apparatus in which the chip is installed to perform operations and/or processing performed by the transmit end in any method embodiment.

Further, the chip may include a communication interface. The communication interface may be an input/output interface, an interface circuit, or the like. Further, the chip may include the memory.

This application further provides a chip. The chip includes a processor. A memory configured to store a computer program is disposed independent of the chip. The processor is configured to execute the computer program stored in the memory, to enable an apparatus in which the chip is installed to perform operations and/or processing performed by the receive end in any method embodiment.

Further, the chip may include a communication interface. The communication interface may be an input/output interface, an interface circuit, or the like. Further, the chip may include the memory.

Optionally, there may be one or more processors, there may be one or more memories, and there may be one or more memories.

In addition, this application further provides a communication apparatus (for example, may be a chip or a chip system), including a processor and a communication interface. Based on operations and/or processing performed by the transmit end in any method embodiment, the communication interface is configured to receive (or input) data and/or information such as first indication information and second indication information, and the processor processes downlink data or uplink to-be-encoded data based on the first indication information and the second indication information. Optionally, the communication interface is further configured to send (or output) data and/or information obtained through processing by the processor, for example, send fifth indication information and send uplink encoded data. Optionally, the communication interface is further configured to receive (or input) data and/or information, for example, receive fourth indication information and receive downlink encoded data.

This application further provides a communication apparatus (for example, may be a chip or a chip system), including a processor and a communication interface. Based on operations and/or processing performed by the receive end in any method embodiment, the processor determines first indication information and second indication information, and processes downlink data or uplink to-be-encoded data based on a first encoding mode and a loss degree, and the communication interface is configured to send (or output) data and/or information such as the first indication information and the second indication information. Optionally, the communication interface is further configured to receive (or input) data and/or information, for example, receive fifth indication information and receive uplink encoded data. Optionally, the communication interface is further configured to send (or output) data and/or information, for example, send fourth indication information and send downlink encoded data.

In addition, this application further provides a communication apparatus, including at least one processor. The at least one processor is coupled to at least one memory. The at least one processor is configured to execute a computer program or instructions stored in the at least one memory, to enable the communication apparatus to perform operations and/or processing performed by the transmit end in any method embodiment.

This application further provides a communication apparatus, including at least one processor. The at least one processor is coupled to at least one memory. The at least one processor is configured to execute a computer program or instructions stored in the at least one memory, to enable the communication apparatus to perform operations and/or processing performed by the receive end in any method embodiment.

In addition, this application further provides a wireless communication system, including the transmit end and the receive end in the method embodiments of this application.

The memory in embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. By way of example but not limitation, RAMs in many forms are available, such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DRRAM). It should be noted that the memory in the system and method described in this specification includes but is not limited to these and any memory of another appropriate type.

All or some of the methods provided in the foregoing embodiments may be implemented by software, hardware, firmware, or any combination thereof. When implemented by software, all or some of the methods may be implemented in a form of a computer program product. The computer program product may include one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, for example, a server or a data center, integrating one or more usable media.

To clearly describe the technical solutions of embodiments of this application, numbers such as "first" and "second" are used in embodiments of this application to distinguish between same items or similar items that provide basically same functions and effects. For example, first information and second information are merely used to distinguish between different information, and do not limit a sending/receiving sequence of the first information and the second information. A person skilled in the art may understand that the numbers such as "first" and "second" do not limit a quantity and an execution sequence, and the words such as "first" and "second" do not indicate a definite difference.

In embodiments of this application, the "message bit" and the "information bit" may sometimes be used alternatively. For example, the message bit set of the polar outer code may also be expressed as the information bit set of the polar outer code. In addition, N_o and $N_o$ may be used alternatively, and N_i and $N_i$ may be used alternatively. There are some similar alternative expressions in this specification, and details are not described again.

In embodiments of this application, "at least one" means one or more, and "a plurality of" means two or more. "And/or" describes an association relationship between associated objects, and indicates that three relationships may exist. For example, A and/or B may indicate the following three cases: Only A exists, both A and B exist, and only B exists, where A and B may be singular or plural. The character "/" usually indicates an "or" relationship between associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be omitted or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions in this application essentially, or the part contributing to the conventional technology, or some of the technical solutions may be implemented in a form of a software product. The computer software product is stored in a storage medium and includes several instructions for instructing a computer device (which may be a personal computer, a server, a network device, or the like) to perform all or some of the steps of the method in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A concatenated code encoding method, comprising:
obtaining a to-be-encoded message bit sequence;
performing polar code encoding on the to-be-encoded message bit sequence based on a frozen bit set and a message bit set that are of a first polar code, to obtain a first encoded code word whose length is N_o;
interleaving the first encoded code word to obtain a second encoded code word;
performing optimized low-density parity-check (LDPC) code encoding on the second encoded code word to obtain a concatenated code word, wherein the interleaving comprises outer interleaving and inner interleaving, wherein:
the outer interleaving comprises:
mapping R frozen bits in the frozen bit set of the first polar code to R rows of a generator matrix of the optimized LDPC code, wherein row weights of the R rows are lower than or equal to row weights of rows of the generator matrix other than the R rows; and
mapping (N_o-R) message bits in the message bit set of the first polar code to remaining (N_o-R) rows of the generator matrix of the optimized LDPC code other than the R rows; and
the inner interleaving comprises:
interleaving on the R frozen bits in the frozen bit set of the first polar code and interleaving on the (N_o-R) message bits in the message bit set of the first polar code; and
outputting the concatenated code word.

2. The method according to claim 1, wherein the method further comprises:

randomly generating a basis matrix of an LDPC code;

optimizing the basis matrix to obtain an optimized basis matrix, wherein the optimized basis matrix is capable of reaching a minimum bit error rate (BER) within a given BER range, and a signal-to-noise ratio (SNR) required at the minimum BER is minimum;

generating a lifting matrix; and obtaining a basis matrix of the optimized LDPC code based on the optimized basis matrix and the lifting matrix, wherein the generator matrix of the optimized LDPC code is determined based on the basis matrix of the optimized LDPC code.

3. The method according to claim 2, wherein a size of the basis matrix is m rows and n columns, and the generating a lifting matrix comprises:

constructing a row vector whose size is m and a column vector whose size is n, wherein any two elements in the row vector are different, any two elements in the column vector are different, both m and n are less than or equal to p, p is a factor by which the basis matrix of the optimized LDPC code needs to be extended, and m, n, and p are all integers; and obtaining the lifting matrix based on the row vector and the column vector.

4. The method according to claim 3, wherein the obtaining the lifting matrix based on the row vector and the column vector comprises:

constructing the lifting matrix $M(i, j) = r_i \cdot c_j \mod p$, wherein:

in the row vector $C_{rows} = (r_1, r_2, \ldots, r_m)$, $r_i$ is an $i^{th}$ element in the row vector $C_{rows}$, $r_i \neq r_j$, in the column vector $C_{cols} = (c_1, c_2, \ldots, c_n)$, $c_j$ is a $j^{th}$ element in the column vector $C_{cols}$, $c_i \neq c_j$, and mod is a modulo operation.

5. The method according to claim 1, wherein the method further comprises:

constructing an initial polar code at a target signal-to-noise ratio (SNR); and performing iterative optimization on the initial polar code a specified quantity of times based on the optimized LDPC code and the initial polar code, to obtain the first polar code, wherein an intermediate polar code is obtained each time the iterative optimization is performed, and, if frame error rate (FER) performance of the concatenated code with an intermediate polar code obtained through $j^{th}$ iterative optimization as an outer code and with the optimized LDPC code as an inner code is better than FER performance of the concatenated code with an intermediate polar code obtained through $(j-1)^{th}$ iterative optimization as an outer code and with the optimized LDPC code as an inner code, the outer code of the concatenated code is updated to the intermediate polar code obtained through the $j^{th}$ iterative optimization; and wherein:

the initial polar code is an initially determined outer code of the concatenated code, and the first polar code is a finally determined outer code of the concatenated code through the iterative optimization the specified quantity of times, wherein >1, j is less than or equal to the specified quantity of times, and j is an integer.

6. A concatenated code decoding method, comprising:

obtaining a channel receive vector whose length is $N_i$, wherein $N_i$ is a length of an inner code of a concatenated code, the inner code of the concatenated code is an optimized low-density parity-check (LDPC) code, an outer code of the concatenated code is a polar code, and $N_i$ is a positive integer;

decoding the channel receive vector by using a soft input soft output (SISO) decoding algorithm of the optimized LDPC code, to obtain a first soft information sequence whose length is $N_i$;

de-interleaving the first soft information sequence to obtain a de-interleaved first soft information sequence, and extracting soft information at first N_o locations in the de-interleaved first soft information sequence to obtain a second soft information sequence, wherein N_o is a length of the outer code of the concatenated code, and N_o is a positive integer;

performing soft information iterative decoding by using a soft successive cancellation list (SCL) decoding algorithm of the polar code and the SISO decoding algorithm of the optimized LDPC code based on the second soft information sequence, the channel receive vector, and a preset maximum iteration quantity of times of the concatenated code, to obtain a third soft information sequence;

performing a hard decision on the third soft information sequence to obtain a decoded candidate sequence; and outputting the decoded candidate sequence.

7. The method according to claim 6, wherein the performing soft information iterative decoding by using a soft SCL decoding algorithm of the polar code and the SISO decoding algorithm of the optimized LDPC code based on the second soft information sequence, the channel receive vector, and a preset maximum iteration quantity of times (max_Iter) of the concatenated code, to obtain a third soft information sequence comprises:

performing soft information iterative decoding (j−1) times to obtain a $(j-1)^{th}$ soft information sequence outputted by the soft SCL decoding algorithm;

subtracting a soft information sequence inputted by the soft SCL decoding algorithm in a $(j-1)^{th}$ soft information iterative decoding process from the $(j-1)^{th}$ soft information sequence, to obtain a $j^{th}$ piece of extrinsic information of the SISO decoding algorithm;

using the $j^{th}$ piece of extrinsic information and the channel receive vector as an input into the SISO decoding algorithm in a $j^{th}$ soft information iterative decoding process, to obtain an output of the SISO decoding algorithm in the $j^{th}$ soft information iteration process; and using the output of the SISO decoding algorithm in the $j^{th}$ soft information iteration process as prior information of the soft SCL decoding algorithm in the $j^{th}$ soft information iterative decoding process, to obtain a $j^{th}$ soft information sequence of the soft SCL decoding algorithm, wherein;

the $j^{th}$ soft information sequence of the soft SCL decoding algorithm is a soft information sequence outputted by the soft SCL decoding algorithm in the $j^{th}$ soft information iteration process;

the $j^{th}$ piece of extrinsic information of the SISO decoding algorithm is extrinsic information inputted to the SISO decoding algorithm in the $j^{th}$ soft information iteration process;

the second soft information sequence is a soft information sequence inputted to the soft SCL decoding algorithm in a first soft information iteration process, and the third soft information sequence is a soft information sequence outputted by the soft SCL decoding algorithm in a last soft information iteration process; and $1 < j \leq \max\_Iter$, and j is a positive integer.

8. The method according to claim 6, wherein:
an input into the soft SCL decoding algorithm comprises a list size and a soft information sequence; and
an output of the soft SCL decoding algorithm comprises a soft information sequence of an encoder-side code word of the polar code and a soft information sequence of a decoder-side code word of the polar code, wherein a soft information sequence for determining extrinsic information of the SISO decoding algorithm is the soft information sequence of the decoder-side code word of the polar code.

9. A communication apparatus, comprising:
a communication interface, the communication interface configured to obtain a to-be-encoded message bit sequence;
at least one processor, configured to:
perform polar code encoding on the to-be-encoded message bit sequence based on a frozen bit set and a message bit set that are of a first polar code, to obtain a first encoded code word whose length is N_o;
interleave the first encoded code word to obtain a second encoded code word; and
perform optimized low-density parity-check (LDPC) code encoding on the second encoded code word to obtain a concatenated code word, wherein:
the interleaving comprises outer interleaving and inner interleaving, wherein:
the outer interleaving comprises:
mapping R frozen bits in the frozen bit set of the first polar code to R rows of a generator matrix of the optimized LDPC code, wherein row weights of the R rows are lower than or equal to row weights of rows of the generator matrix other than the R rows, and
mapping (N_o−R) message bits in the message bit set of the first polar code to remaining (N_o−R) rows of the generator matrix of the optimized LDPC code other than the R rows; and
the inner interleaving comprises:
interleaving on the R frozen bits in the frozen bit set of the first polar code and interleaving on the (N_o−R) message bits in the message bit set of the first polar code; and
wherein the communication interface is further, configured to output the concatenated code word.

10. The communication apparatus according to claim 9, wherein the at least one processor is further configured to:
randomly generate a basis matrix of an LDPC code;
optimize the basis matrix to obtain an optimized basis matrix, wherein the optimized basis matrix is capable of reaching a minimum bit error rate (BER) within a given BER range, and a signal-to-noise ratio (SNR) required at the minimum BER is minimum;
generate a lifting matrix; and
obtain a basis matrix of the optimized LDPC code based on the optimized basis matrix and the lifting matrix, wherein the generator matrix of the optimized LDPC code is determined based on the basis matrix of the optimized LDPC code.

11. The communication apparatus according to claim 10, wherein:
a size of the basis matrix is m rows and n columns, and the at least one processor is configured to:
construct a row vector whose size is m and a column vector whose size is n, wherein any two elements in the row vector are different, any two elements in the column vector are different, both m and n are less than or equal to p, p is a factor by which the basis matrix of the optimized LDPC code needs to be extended, and m, n, and p are all integers; and
obtain the lifting matrix based on the row vector and the column vector.

12. The communication apparatus according to claim 11, wherein the at least one processor is configured to:
construct the lifting matrix $M(i, j) = r_i \cdot c_j \mod p$, wherein;
in the row vector $C_{rows} = (r_1, r_2, \ldots, r_m)$, $r_i$ is an $i^{th}$ element in the row vector $C_{rows}$, $r_i \neq r_j$, in the column vector $C_{cols} = (c_1, c_2, \ldots, c_n)$, $c_j$ is a $j^{th}$ element in the column vector $C_{Cols}$, $c_i \neq c_j$, and mod is a modulo operation.

13. The communication apparatus according to claim 9, wherein the at least one processor is configured to:
construct an initial polar code at a target signal-to-noise ratio (SNR); and
perform iterative optimization on the initial polar code a specified quantity of times based on the optimized LDPC code and the initial polar code, to obtain the first polar code, wherein an intermediate polar code is obtained each time the iterative optimization is performed, and, if frame error rate (FER) performance of the concatenated code with an intermediate polar code obtained through $j^{th}$ iterative optimization as an outer code and with the optimized LDPC code as an inner code is better than FER performance of the concatenated code with an intermediate polar code obtained through $(j-1)^{th}$ iterative optimization as an outer code and with the optimized LDPC code as an inner code, the outer code of the concatenated code is updated to the intermediate polar code obtained through the $j^{th}$ iterative optimization; and wherein:
the initial polar code is an initially determined outer code of the concatenated code, and the first polar code is a finally determined outer code of the concatenated code through the iterative optimization the specified quantity of times, wherein >1, j is less than or equal to the specified quantity of times, and j is an integer.

* * * * *